US007627185B2

(12) United States Patent
Miyazawa et al.

(10) Patent No.: US 7,627,185 B2
(45) Date of Patent: Dec. 1, 2009

(54) HIERARCHICALLY COMPRESSING AND CODING AND STORING IMAGE DATA

(75) Inventors: Toshio Miyazawa, Kanagawa (JP); Yasuyuki Nomizu, Kanagawa (JP); Hiroyuki Sakuyama, Tokyo (JP); Junichi Hara, Kanagawa (JP); Nekka Matsuura, Kanagawa (JP); Takanori Yano, Kanagawa (JP); Taku Kodama, Kanagawa (JP); Yasuyuki Shinkai, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 835 days.

(21) Appl. No.: 10/767,017

(22) Filed: Jan. 28, 2004

(65) Prior Publication Data
US 2005/0036701 A1    Feb. 17, 2005

(30) Foreign Application Priority Data
Jan. 30, 2003    (JP)    ............................. 2003-022444
Jan. 22, 2004    (JP)    ............................. 2004-014628

(51) Int. Cl.
*G06K 9/46* (2006.01)
*G06F 7/00* (2006.01)

(52) U.S. Cl. ...................................... 382/240; 707/102
(58) Field of Classification Search .................. 382/240
See application file for complete search history.

(56) References Cited

U.S. PATENT DOCUMENTS

| | | | |
|---|---|---|---|
| 5,878,156 A * | 3/1999 | Okumura | ..................... 382/118 |
| 6,070,167 A * | 5/2000 | Qian et al. | ................... 707/102 |
| 6,879,726 B2 | 4/2005 | Sato et al. | |
| 2002/0091665 A1* | 7/2002 | Beek et al. | ..................... 707/1 |
| 2002/0196350 A1* | 12/2002 | Cooper | .................... 348/223.1 |
| 2003/0007687 A1* | 1/2003 | Nesterov et al. | ............ 382/167 |
| 2003/0014444 A1* | 1/2003 | Wu | ............................. 707/515 |
| 2003/0093227 A1* | 5/2003 | Stoughton et al. | ............. 702/20 |
| 2003/0099376 A1* | 5/2003 | Kim et al. | ................... 382/103 |
| 2003/0198402 A1* | 10/2003 | Zhang et al. | ................ 382/276 |

FOREIGN PATENT DOCUMENTS

| | | |
|---|---|---|
| JP | 2002-057902 | 2/2002 |
| JP | A 2002-281444 | 9/2002 |

OTHER PUBLICATIONS

Skodras et al., The JPEG 2000 Still Image Compression Standard, Sep. 2001, IEEE Signal Processing Magazine, vol. 18, Issue 5, p. 36-58.*
Japanese Office Action dated Jun. 9, 2009; JP Patent Application No. 2008-217777, 3 pages.
Japanese Office Action dated Jul. 1, 2008, JP Patent Application No. 2004-014628, 2 pages.

* cited by examiner

*Primary Examiner*—Bhavesh M Mehta
*Assistant Examiner*—David P Rashid
(74) *Attorney, Agent, or Firm*—Blakely, Sokoloff, Taylor & Zafman LLP

(57) ABSTRACT

An image processing apparatus hierarchically compresses and codes image data by subjecting pixel values of the image data to a discrete wavelet transform, quantization and coding for each of one or a plurality of rectangular regions into which the image data is divided. The image processing apparatus includes a hierarchical coding unit to compress and code the image data in a state where the image data is divided for each hierarchical layer, to obtain compressed codes, and a distributively storing unit to distributively store the compressed codes that are divided for each hierarchical layer by the hierarchical coding unit.

9 Claims, 19 Drawing Sheets

FIG.12

| 1ST LEVEL DATA STORAGE  34 | 1LL, 1HL, 1LH, 1HH |
|---|---|
| 2ND LEVEL DATA STORAGE  35 | 2LL, 2HL, 2LH, 2HH |
| 3RD LEVEL DATA STORAGE  36 | 3LL, 3HL, 3LH, 3HH |

FIG.13

| 1ST LEVEL DATA STORAGE  34 | 1HL, 1LH, 1HH |
|---|---|
| 2ND LEVEL DATA STORAGE  35 | 2HL, 2LH, 2HH |
| 3RD LEVEL DATA STORAGE  36 | 3LL, 3HL, 3LH, 3HH |

HIERARCHICALLY COMPRESSING AND CODING AND STORING IMAGE DATA

The present application claims priority to the corresponding Japanese Application Nos. 2003-022444, filed on Jan. 30, 2003, and 2004-014628, filed on Jan. 22, 2004, the entire contents of which are hereby incorporated by reference.

BACKGROUND OF THE INVENTION

1. Field of the Invention

The present invention generally relates to, and more particularly to image processing apparatuses and computer-readable storage media, and more particularly to an image processing apparatus that codes image data hierarchically, and to a computer-readable storage medium that stores a program for causing a computer to carry out such a hierarchical coding.

2. Description of the Related Art

Due to improvements made in image input techniques and image output techniques, there are increased demands to improve the high definition property of color still images. One example of an image input apparatus is a digital camera (DC), and helped by reduced cost of high-performance charge coupled devices (CCDs) having 3,000,000 or more pixels, such high-performance CCDs are widely used for digital cameras in the popular price range. It is expected that products using CCDs having 5,000,000 or more pixels will be put on the market in the near future. This trend of increasing the number of pixels of the image input device is expected to continue.

On the other hand, considerable improvements have also been made in image output devices and image display devices, such as hard-copy devices including laser printers, ink jet printers and thermal printers, and soft-copy devices including flat panel displays made of cathode ray tubes (CRTs), liquid crystal displays (LCDs) and plasma display panels (PDPs). The high definition property of such image output devices and image display devices have improved considerably, and the cost has greatly been reduced.

Because of these high-performance and inexpensive image input devices and image output devices on the market, the use of high-definition images have become popular. It is expected that the demands for high-definition images will increase in the future in various fields. Actually, the developments in personal computers (PCs) and network-related technologies including the Internet have accelerated such trends. Especially in recent years, mobile equipments such as portable telephones and laptop computers have become extremely popular, and there are more and more opportunities to transmit or receive high-definition images via a communication unit.

Consequently, it is expected that the demands to further improve the performance or function of the image compression and/or expansion techniques will increase in order to facilitate processing of the high-definition images.

As one of image compression and expansion algorithms for facilitating the processing of such high-definition still images, the JPEG (Joint Photographic Experts Group) system is popularly used. In addition, the JPEG2000, which has become an international standard in 2001, uses an image compression and expansion algorithm with a high performance that is further improved compared to the JPEG. The JPEG2000 divides the image into rectangular regions called tiles, and is capable of carrying out the compression and expansion process under a relatively small memory capacity environment. In other words, each tile becomes a basic unit of the compression and expansion process, and the compression and expansion process can be carried out independently for each tile. In addition, according to the JPEG2000, it is possible to separate a low-resolution data and a high-resolution data within one image file.

However, the algorithm of the JPEG2000 is complex, and the load on the coding process and the decoding process is large compared to that of the conventional JPEG. For example, the load on a server computer is large even in a case where the image files are compressed according to the JPEG2000 and stored in the server computer, a client computer makes access to the server computer to extract only the low-resolution data from the compressed image files when necessary to make a thumbnail display process.

SUMMARY OF THE INVENTION

An image processing technique, including an apparatus and computer-readable storage medium, is described. In one embodiment, an image processing apparatus hierarchically compresses and codes image data by subjecting pixel values of the image data to a discrete wavelet transform, quantization and coding for each of one or a plurality of rectangular regions into which the image data is divided. The image processing apparatus comprises a hierarchical coding unit to compress and code the image data in a state where the image data is divided for each hierarchical layer, to obtain compressed codes, and a distributively storing unit to distributively store the compressed codes that are divided for each hierarchical layer by the hierarchical coding unit.

BRIEF DESCRIPTION OF THE DRAWINGS

FIG. 12 is a diagram showing compressed codes stored by first through third hierarchical layer data storage unit;

FIG. 13 is a diagram showing other compressed codes stored by first through third hierarchical layer data storage units;

DETAILED DESCRIPTION OF THE INVENTION

Figure 1:
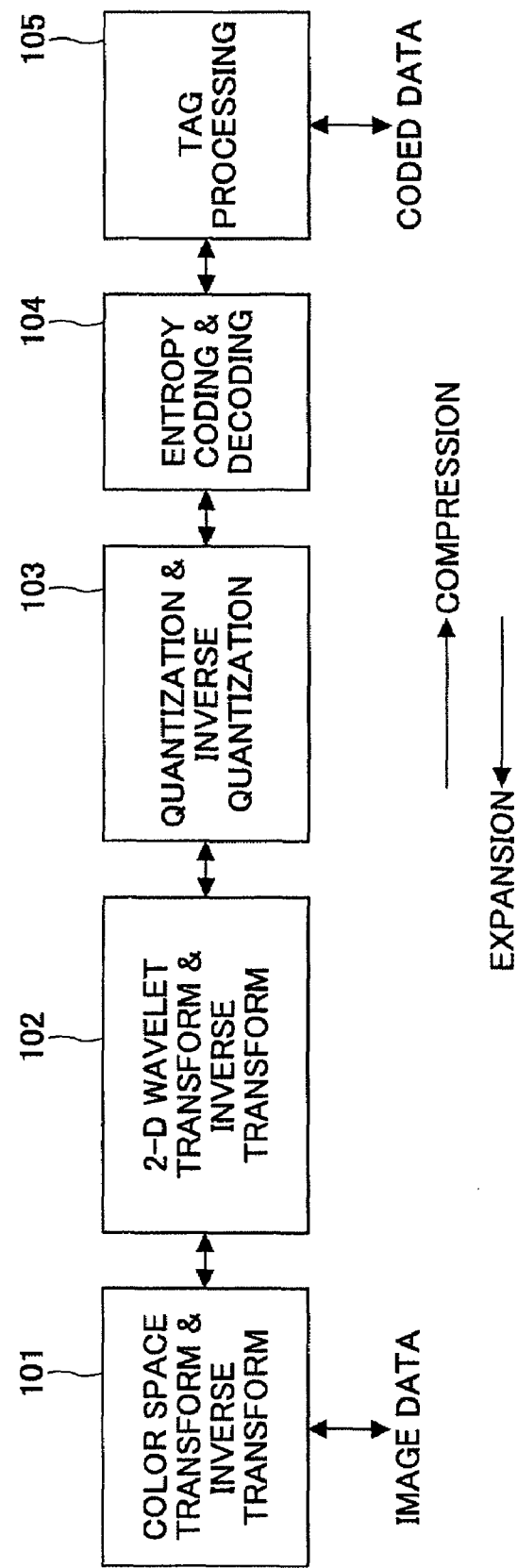
FIG. 1 is a system block diagram for illustrating the operating principle of the JPEG2000 algorithm.

One or more embodiments of the present invention include a novel and useful image processing apparatus and computer-readable storage medium, in which the problems described above are eliminated.

Other and more specific embodiments of the present invention include an image processing apparatus and a computer-readable storage medium, which can distribute the processing load when creating data and when outputting data by displaying or printing the data, in order to realize a high-speed processing.

Still another and more specific embodiment of the present invention includes an image processing apparatus for hierarchically compressing and coding image data by subjecting pixel values of the image data to a discrete wavelet transform, quantization and coding for each of one or a plurality of rectangular regions into which the image data is divided. The image processing apparatus comprises a hierarchical coding unit to compress and code the image data in a state where the image data is divided for each hierarchical layer, to obtain compressed codes; and a distributively storing unit to distributively store the compressed codes that are divided for each hierarchical layer by the hierarchical coding unit. According to the image processing apparatus of one embodiment of the present invention, if a display screen region is limited as in the case of a portable telephone, for example, the image may be displayed by obtaining only the compressed codes in the hierarchical layer of the low resolution. Hence, the processing load can be distributed when creating data and when outputting data by displaying or printing the data, in order to realize a high-speed processing.

A further embodiment of the present invention includes an image processing apparatus for hierarchically compressing and coding image data by subjecting pixel values of the image data to a discrete wavelet transform, quantization and coding for each of one or a plurality of rectangular regions into which the image data is divided, where the image processing apparatus is part of an electronic equipment that is coupled to a network having other electronic equipments coupled thereto, and comprises a hierarchical coding unit to compress and code the image data in a state where the image data is divided for each hierarchical layer, to obtain compressed codes and a distributively storing unit to distributively store the compressed codes which are divided for each hierarchical layer by the hierarchical coding unit into a storage unit of each of the other electronic equipments. According to the image processing apparatus of one embodiment of the present invention, if a display screen region is limited as in the case of a portable telephone, for example, the image may be displayed by obtaining only the compressed codes in the hierarchical layer of the low resolution from the storage unit of one of the other electronic equipments. Hence, the processing load can be distributed when creating data and when outputting data by displaying or printing the data, in order to realize a high-speed processing.

Another embodiment of the present invention includes an image processing apparatus for hierarchically compressing and coding image data by subjecting pixel values of the image data to a discrete wavelet transform, quantization and coding for each of one or a plurality of rectangular regions into which the image data is divided, where the image processing apparatus comprises hierarchical coding means for compressing and coding the image data in a state where the image data is divided for each hierarchical layer, to obtain compressed codes, and distributively storing means for distributively storing the compressed codes which are divided for each hierarchical layer by the hierarchical coding unit. According to the image processing apparatus of one embodiment of the present invention, if a display screen region is limited as in the case of a portable telephone, for example, the image may be displayed by obtaining only the compressed codes in the hierarchical layer of the low resolution. Hence, the processing load can be distributed when creating data and when outputting data by displaying or printing the data, in order to realize a high-speed processing.

Still another embodiment of the present invention includes an image processing apparatus for hierarchically compressing and coding image data by subjecting pixel values of the image data to a discrete wavelet transform, quantization and coding for each of one or a plurality of rectangular regions into which the image data is divided, where the image processing apparatus is part of an electronic equipment that is coupled to a network having other electronic equipments coupled thereto, and comprises hierarchical coding means for compressing and coding the image data in a state where the image data is divided for each hierarchical layer, to obtain compressed codes; and distributively storing means for distributively storing the compressed codes which are divided for each hierarchical layer by the hierarchical coding unit into storage units of each of the other electronic equipments. According to the image processing apparatus of one embodiment of the present invention, if a display screen region is limited as in the case of a portable telephone, for example, the image may be displayed by obtaining only the compressed codes in the hierarchical layer of the low resolution from the storage unit of one of the other electronic equipments. Hence, the processing load can be distributed when creating data and when outputting data by displaying or printing the data, in order to realize a high-speed processing.

A further embodiment of the present invention includes an image processing apparatus for hierarchically compressing and coding image data by subjecting pixel values of the image data to a discrete wavelet transform, quantization and coding for each of one or a plurality of rectangular regions into which the image data is divided, where the image processing apparatus comprises a rectangular region coding unit to compress and code the image data in a state where the image data is divided for each rectangular region, to obtain compressed codes and a distributively storing unit to distributively store the compressed codes which are divided for each rectangular region by the rectangular region coding unit. According to the image processing apparatus of one embodiment of the present invention, the image may be displayed or printed by combining each of the rectangular region images. In addition, if only a predetermined region specified by the user and not the entire image is to be displayed or printed, the image of the predetermined region may be displayed or printed by obtaining the compressed codes of each rectangular region included in the predetermined region. As a result, the processing load can be distributed when creating data and when outputting data by displaying or printing the data, in order to realize a high-speed processing.

In the image processing apparatus, the rectangular region coding unit may compress and code the image data with a decomposition level dependent on a type of the image data, a type of region of the image data, a type of source electronic equipment of the image data or, an external instruction. In this case, it is possible to compress and code the image data depending on the resolution that is requested when displaying the image data.

Another embodiment of the present invention includes an image processing apparatus for hierarchically compressing and coding image data by subjecting pixel values of the image data to a discrete wavelet transform, quantization and coding for each of one or a plurality of rectangular regions into which the image data is divided, where the image processing apparatus is part of an electronic equipment that is coupled to a network having other electronic equipments coupled thereto, and comprises a rectangular region coding unit to compress and code the image data in a state where the image data is divided for each rectangular region, to obtain compressed codes; and a distributively storing unit to distributively store the compressed codes which are divided for each rectangular region by the rectangular region coding unit into a storage unit of each of the other electronic equipments. According to the image processing apparatus of one embodiment of the present invention, the image may be displayed or printed by combining each of the rectangular region images. In addition, if only a predetermined region specified by the user and not the entire image is to be displayed or printed, the image of the predetermined region may be displayed or printed by obtaining the compressed codes of each rectangular region included in the predetermined region from the storage unit of the other electronic equipments. As a result, the processing load can be distributed when creating data and when outputting data by displaying or printing the data, in order to realize a high-speed processing.

In the image processing apparatus, the rectangular region coding unit may compress and code the image data with a decomposition level dependent on a type of the image data, a type of region of the image data, a type of source electronic equipment of the image data or, an external instruction. In this case, it is possible to compress and code the image data depending on the resolution that is requested when displaying the image data.

Still another embodiment of the present invention includes an image processing apparatus for hierarchically compressing and coding image data by subjecting pixel values of the image data to a discrete wavelet transform, quantization and coding for each of one or a plurality of rectangular regions into which the image data is divided, where the image processing apparatus comprising rectangular region coding means for compressing and coding the image data in a state where the image data is divided for each rectangular region, to obtain compressed codes; and distributively storing means for distributively storing the compressed codes which are divided for each rectangular region by the rectangular region coding unit. According to the image processing apparatus of one embodiment of the present invention, the image may be displayed or printed by combining each of the rectangular region images. In addition, if only a predetermined region specified by the user and not the entire image is to be displayed or printed, the image of the predetermined region may be displayed or printed by obtaining the compressed codes of each rectangular region included in the predetermined region. As a result, the processing load can be distributed when creating data and when outputting data by displaying or printing the data, in order to realize a high-speed processing.

A further embodiment of the present invention includes an image processing apparatus for hierarchically compressing and coding image data by subjecting pixel values of the image data to a discrete wavelet transform, quantization and coding for each of one or a plurality of rectangular regions into which the image data is divided, where the image processing apparatus is part of an electronic equipment that is coupled to a network having other electronic equipments coupled thereto, and comprises rectangular region coding means for compressing and coding the image data in a state where the image data is divided for each rectangular region, to obtain compressed codes; and distributively storing means for distributively storing the compressed codes which are divided for each rectangular region by the rectangular region coding unit into storage units of each of the other electronic equipments. According to the image processing apparatus of one embodiment of the present invention, the image may be displayed or printed by combining each of the rectangular region images. In addition, if only a predetermined region specified by the user and not the entire image is to be displayed or printed, the image of the predetermined region may be displayed or printed by obtaining the compressed codes of each rectangular region included in the predetermined region from the storage unit of the other electronic equipments. As a result, the processing load can be distributed when creating data and when outputting data by displaying or printing the data, in order to realize a high-speed processing.

Another embodiment of the present invention includes a computer-readable storage medium which stores a program for causing a computer to carry out an image data processing method for hierarchically compressing and coding image data by subjecting pixel values of the image data to a discrete wavelet transform, quantization and coding for each of one or a plurality of rectangular regions into which the image data is divided, the method comprising causing the computer to compress and code the image data in a state where the image data is divided for each hierarchical layer, to obtain compressed codes; and causing the computer to distributively store the compressed codes which are divided for each hierarchical layer by the hierarchical coding procedure. According to the computer-readable storage medium of one embodiment of the present invention, if a display screen region is limited as in the case of a portable telephone, for example, the image may be displayed by obtaining only the compressed codes in the hierarchical layer of the low resolution. Hence, the processing load can be distributed when creating data and when outputting data by displaying or printing the data, in order to realize a high-speed processing.

Still another embodiment of the present invention includes a computer-readable storage medium which stores a program for causing a computer to carry out an image data processing method for hierarchically compressing and coding image data by subjecting pixel values of the image data to a discrete wavelet transform, quantization and coding for each of one or a plurality of rectangular regions into which the image data is divided, where the computer is part of an electronic equipment that is coupled to a network having other electronic equipments coupled thereto, and the method comprises causing the computer to compress and code the image data in a state where the image data is divided for each hierarchical layer, to obtain compressed codes and causing the computer to distributively store the compressed codes which are divided for each hierarchical layer by the hierarchical coding procedure into a storage unit of each of the other electronic equipments. According to the computer-readable storage medium of one embodiment of the present invention, if a display screen region is limited as in the case of a portable telephone, for example, the image may be displayed by obtaining only the compressed codes in the hierarchical layer of the low resolution from the storage unit of one of the other electronic equipments. Hence, the processing load can be distributed when creating data and when outputting data by displaying or printing the data, in order to realize a high-speed processing.

A further embodiment of the present invention includes a computer-readable storage medium which stores a program for causing a computer to carry out an image data processing method for hierarchically compressing and coding image data by subjecting pixel values of the image data to a discrete wavelet transform, quantization and coding for each of one or a plurality of rectangular regions into which the image data is divided, where the method comprises causing the computer to compress and code the image data in a state where the image data is divided for each rectangular region, to obtain compressed codes; and causing the computer to distributively store the compressed codes which are divided for each rectangular region by the rectangular region coding procedure. According to the computer-readable storage medium of one embodiment of the present invention, the image may be displayed or printed by combining each of the rectangular region images. In addition, if only a predetermined region specified by the user and not the entire image is to be displayed or printed, the image of the predetermined region may be displayed or printed by obtaining the compressed codes of each rectangular region included in the predetermined region. As a result, the processing load can be distributed when creating data and when outputting data by displaying or printing the data, in order to realize a high-speed processing.

In the computer-readable storage medium, causing the computer to compress and code the image data may cause the computer to compress and code the image data with a decomposition level dependent on a type of the image data, a type of region of the image data, a type of source electronic equipment of the image data or, an external instruction. In this case, it is possible to compress and code the image data depending on the resolution that is requested when displaying the image data.

Another embodiment of the present invention includes a computer-readable storage medium which stores a program for causing a computer to carry out an image data processing method for hierarchically compressing and coding image data by subjecting pixel values of the image data to a discrete wavelet transform, quantization and coding for each of one or a plurality of rectangular regions into which the image data is divided, where the computer is part of an electronic equipment that is coupled to a network having other electronic equipments coupled thereto, and the method comprises causing the computer to compress and code the image data in a state where the image data is divided for each rectangular region, to obtain compressed codes, and causing the computer to distributively store the compressed codes which are divided for each rectangular region by the rectangular region coding procedure into a storage unit of each of the other electronic equipments. According to the computer-readable storage medium of one embodiment of the present invention, the image may be displayed or printed by combining each of the rectangular region images. In addition, if only a predetermined region specified by the user and not the entire image is to be displayed or printed, the image of the predetermined region may be displayed or printed by obtaining the compressed codes of each rectangular region included in the predetermined region from the storage unit of the other electronic equipments. As a result, the processing load can be distributed when creating data and when outputting data by displaying or printing the data, in order to realize a high-speed processing.

In the computer-readable storage medium, causing the computer to compress and code the image data may cause the computer to compress and code the image data with a decomposition level dependent on a type of the image data, a type of region of the image data, a type of source electronic equipment of the image data or, an external instruction. In this case, it is possible to compress and code the image data depending on the resolution that is requested when displaying the image data.

Therefore, it is possible to realize an image processing apparatus and a computer-readable storage medium, which can distribute the processing load when creating data and when outputting data by displaying or printing the data, in order to realize a high-speed processing.

Other embodiments and further features of the present invention will be apparent from the following detailed description when read in conjunction with the accompanying drawings.

A description will be given of one embodiment of an image processing apparatus according to one embodiment of the present invention, by referring to FIGS. 1 through 11.

A general description will first be given of the hierarchical coding algorithm and the JPEG2000 algorithm. A detailed description of the JPEG2000 algorithm will be omitted in this specification, because the JPEG2000 algorithm itself is known.

FIG. 1 is a system block diagram for illustrating the operating principle of the JPEG2000 algorithm, that is, the hierarchical coding algorithm that forms the basis of the JPEG2000. The JPEG2000 algorithm is realized by a color space transform and inverse transform unit 101, a two-dimensional wavelet transform and inverse transform unit 102, a quantization and inverse quantization unit 103, an entropy coding and decoding unit 104, and a tag processing unit 105.

It may be seen from FIG. 1 that the transformation method is one of the largest differences between the JPEG and the JPEG2000. The JPEG system employs a discrete cosine transform (DCT), while the hierarchical coding algorithm of the JPEG2000 system employs the discrete wavelet transform (DWT) in the two-dimensional wavelet transform and inverse transform unit 102. Compared to the DCT, the DWT has an advantage in that the image quality is good in the high compression region, which is the main reason for employing the DWT in the JPEG2000 system.

Another large difference between the JPEG and the JPEG2000 is that the JPEG2000 additionally uses a functional block called the tag processing unit 105 at the last stage for forming codes. The tag processing unit 105 generates the compressed data as a code stream at the time of the compression operation, and interprets the code stream necessary for the expansion at the time of the expansion operation. The JPEG2000 can realize various convenient functions by the code stream. For example, it is possible to freely stop the compression and expansion operation with respect to the still image at an arbitrary hierarchical layer (decomposition level)

in correspondence with an octave division in the block-based DWT, as may be seen from FIG. 3 which will be described later.

At the original image input and output units shown in FIG. 1, the color space transform and inverse transform unit 101 is connected in most cases. For example, a transformation from the RGB colorimetric system made up of red (R), green (G) and blue (B) components of the primary color system or, from the YMC colorimetric system made up of yellow (Y), magenta (M) and cyan (C) components of the complementary color system, to the YUV or YCrCb colorimetric system or, an inverse transformation, is carried out in the color space transform and inverse transform unit 101.

Next, a description will be given of the JPEG2000 algorithm. The technical terms related to the JPEG2000 are in conformance with the JPEG2000 Final Draft International Standard (FDIS). Typical technical terms are defined as follows.

1. "Bit-Plane:" A two-dimensional array of bits. In this Recommendation International Standard a bit-plane refers to all the bits of the same magnitude in all coefficients or samples. This could refer to a bit-plane in a component, tile-component, code-block, region of interest, or other.
2. "Code-Block:" A rectangular grouping of coefficients from the same sub-band of a tile-component.
3. "Decomposition Level:" A collection of wavelet sub-bands where each coefficient has the same spatial impact or span with respect to the source component samples. These include the HL, LH, and HH sub-bands of the same two-dimensional sub-band decomposition. For the last decomposition level the LL sub-band is also included.
4. "Layer:" A collection of compressed image data from coding pass of one, or more, code-blocks of a tile-component. Layers have an order for coding and decoding and decoding that must be preserved.
5. "Precinct:" A one rectangular region of a transformed tile-component, within each resolution level, used for limiting the size of packets.

Figure 2:
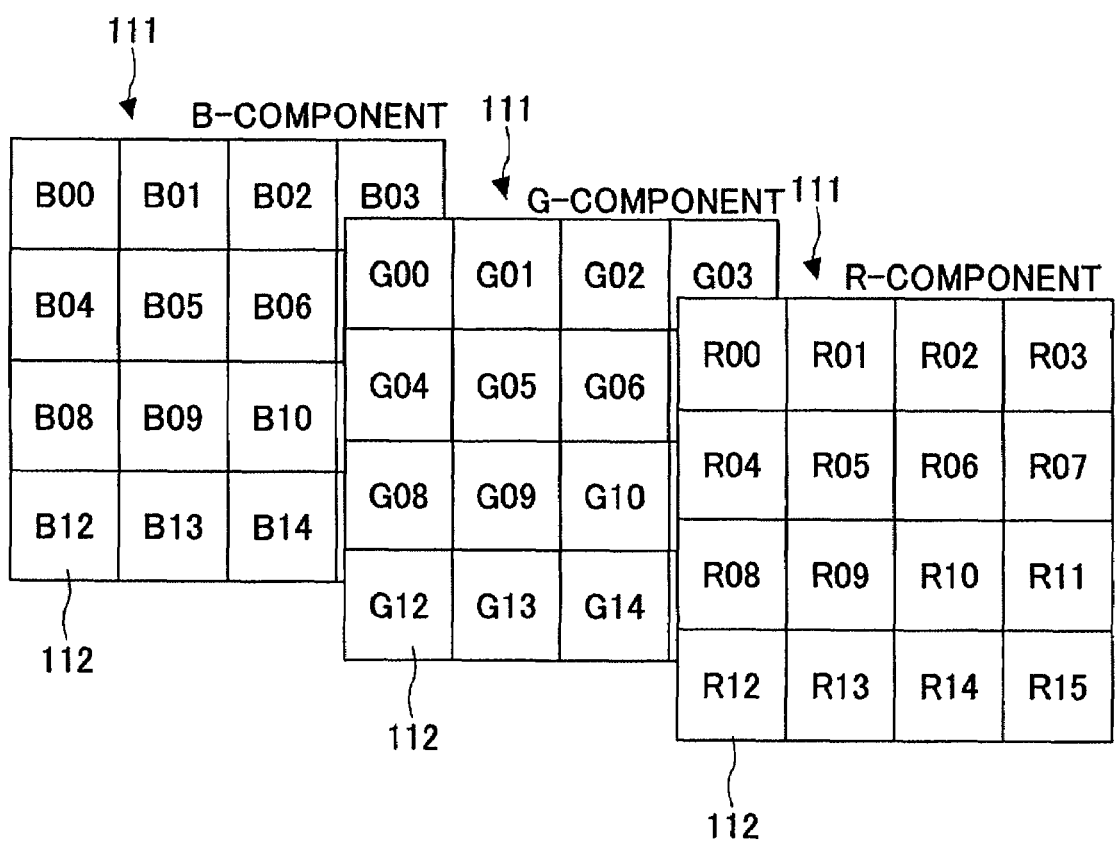
FIG. 2 is a diagram showing an example of each component of a color image divided into tiles.

FIG. 2 is a diagram showing an example of each component of a color image divided into tiles. Generally, each of components 111 (RGB primary color system in this case) of the original image is divided into rectangular regions (tiles) 112 in the color image as shown in FIG. 2. Each of the tiles 112, such as R00, R01, . . . , R15, G00, G01, . . . , G15, B00, B01, . . . , B15, becomes a basic unit for executing the compression and expansion process. Accordingly, the compression and expansion operation is independently carried out for every component 111 and for every tile 112.

At the time of the coding, the data of each tile 112 of each component 111 is input to the color space transform and inverse transform unit 101 and subjected to a color space transform, and is thereafter subjected to a two-dimensional wavelet transform (forward transform) in the two-dimensional wavelet transform unit 102 and spatially divided into frequency bands.

Figure 3:
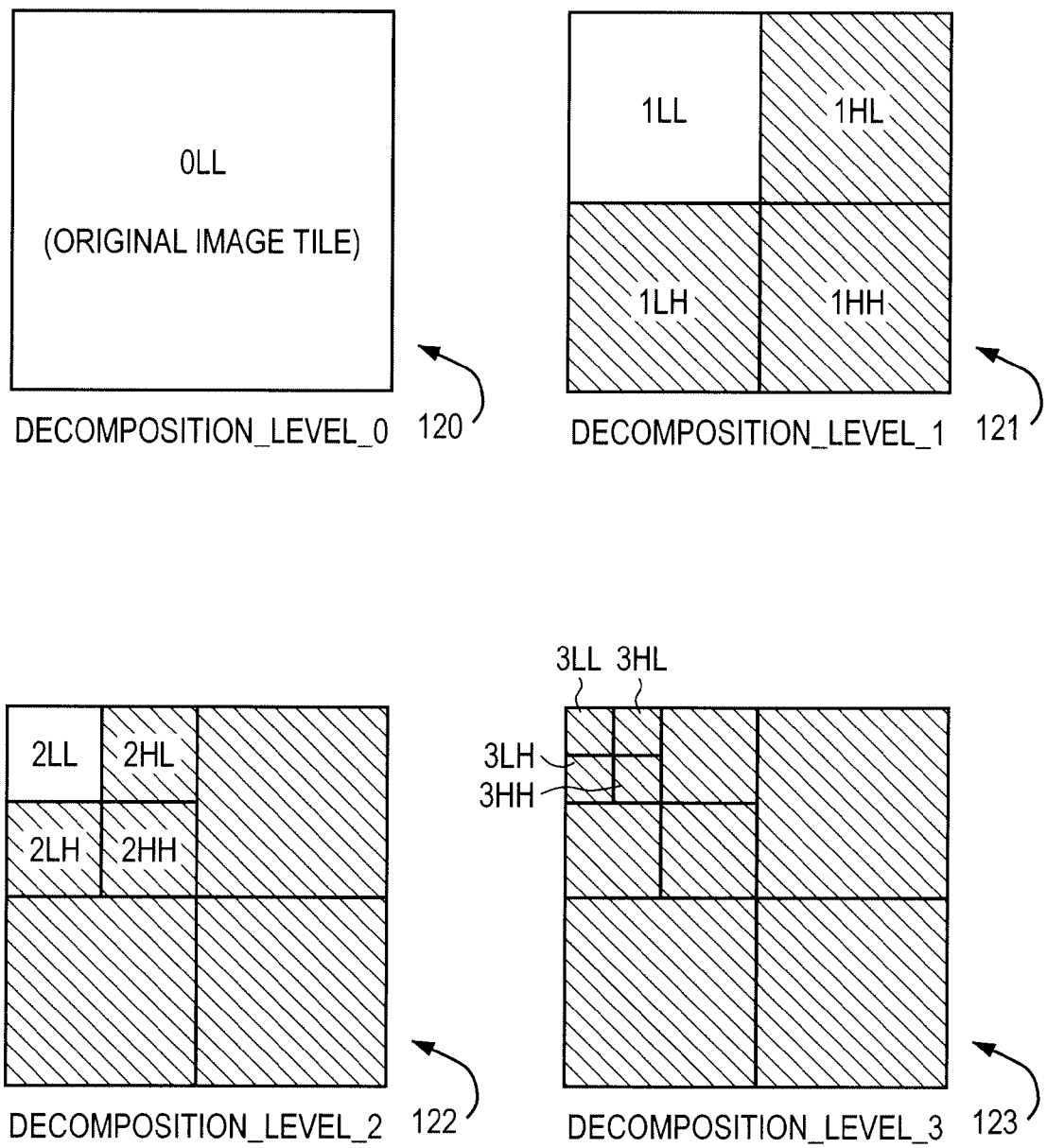
FIG. 3 is a diagram showing an example of a sub-band at each decomposition level for a case where the decomposition level is 3.

FIG. 3 is a diagram showing an example of a sub-band at each decomposition level for a case where the decomposition level is 3. The two-dimensional wavelet transform is carried out by the two-dimensional wavelet transform unit 102 with respect to the tile original image (0LL) (decomposition level 0 (120)) obtained by the tile-division of the original image, in order to separate the sub-bands (1LL, 1HL, 1LH, 1HH) indicated by the decomposition level 1 (121). The two-dimensional wavelet transform is then carried out with respect to the low-frequency component 1LL at this level, in order to separate the sub-bands (2LL, 2HL, 2LH, 2HH) indicated by the decomposition level 2 (122). Similarly thereafter, the two-dimensional wavelet transform is also carried out with respect to the low-frequency component 2LL, in order to separate the sub-bands (3LL, 3HL, 3LH, 3HH) indicating the decomposition level 3 (123). In FIG. 3, the color of the sub-band that is the target of the coding at each decomposition level is indicated by gray. For example, when the decomposition level is 3, the sub-bands (3HL, 3LH, 3HH, 2HL, 2LH, 2HH, 1HL, 1LH, 1HH) indicated by gray are the coding targets, and the 3LL sub-band is not coded.

Next, the bits that are the coding targets are determined in the specified coding order, and context is generated from the peripheral bits of the target bit in the quantization and inverse quantization unit 103. The wavelet coefficients after the quantization process ends are divided into non-overlapping rectangular regions called precincts, for each of the individual sub-bands. The precincts are introduced to efficiently utilize the memory upon implementation.

Figure 4:
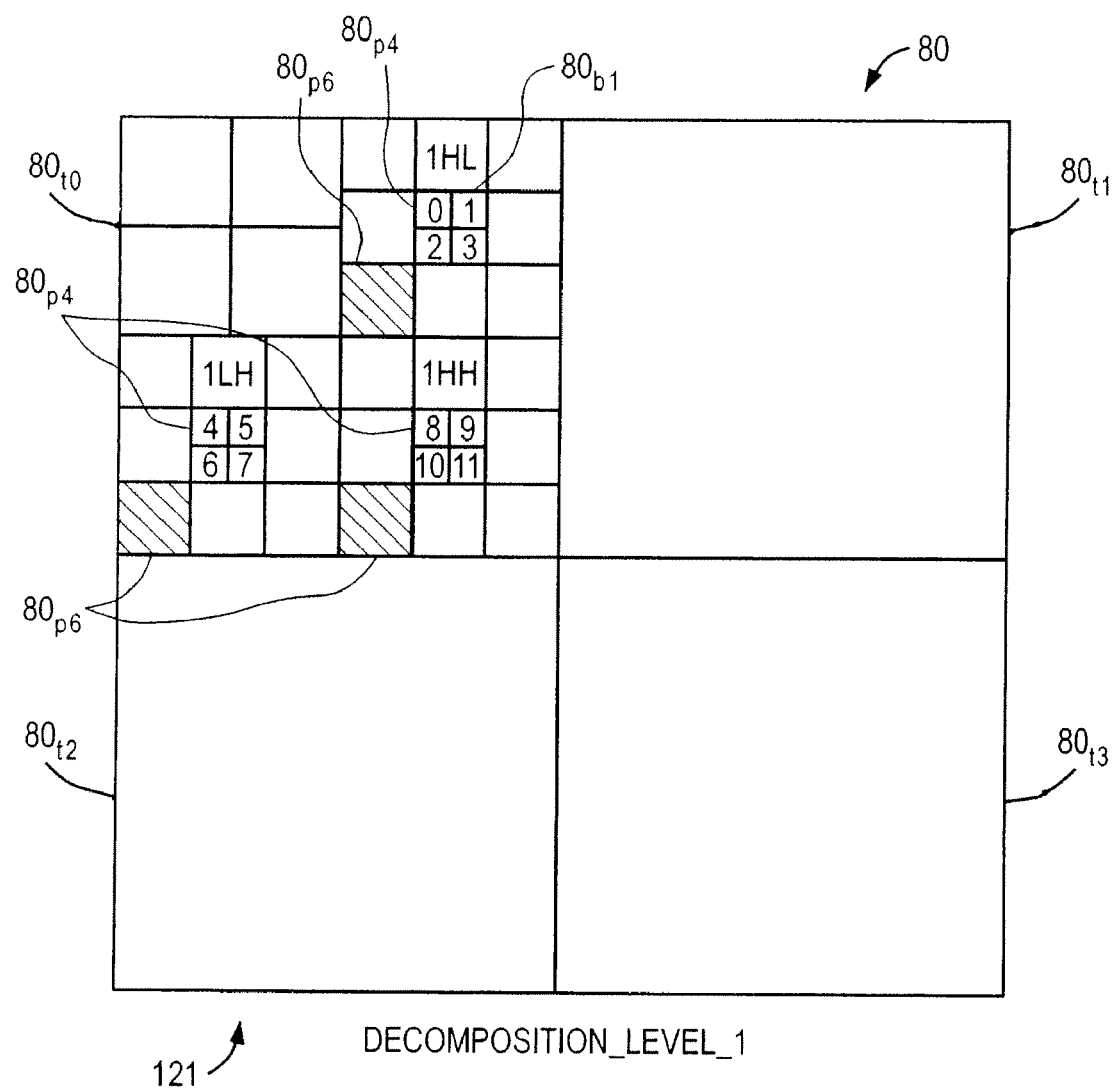
FIG. 4 is a diagram for illustrating one example of the relationship of a precinct and a code block.

FIG. 4 is a diagram for illustrating one example of the relationship of the precinct and the code block. An original image 80 is divided into 4 tiles $80_{t0}$, $80_{t1}$, $80_{t2}$ and $80_{t3}$ at the decomposition level 1. As shown in FIG. 4, a precinct $80_{p4}$, for example, is made up of 3 spatially matching rectangular regions, and the same holds true for a precinct $80_{p6}$. Furthermore, each precinct is divided into non-overlapping rectangular blocks called code blocks. In this particular example, each precinct is divided into 12 code blocks 0 to 11, and for example, a code block $80_{b1}$ indicates a code block number 1. The code block becomes a basic unit when carrying out the entropy coding.

The coefficients after the wavelet transform may be quantized and coded as they are. However, in order to improve the coding efficiency, the JPEG2000 decomposes the coefficient values into bit-plane units, and the bit-planes may be ordered for every pixel or code block.

Figure 5:
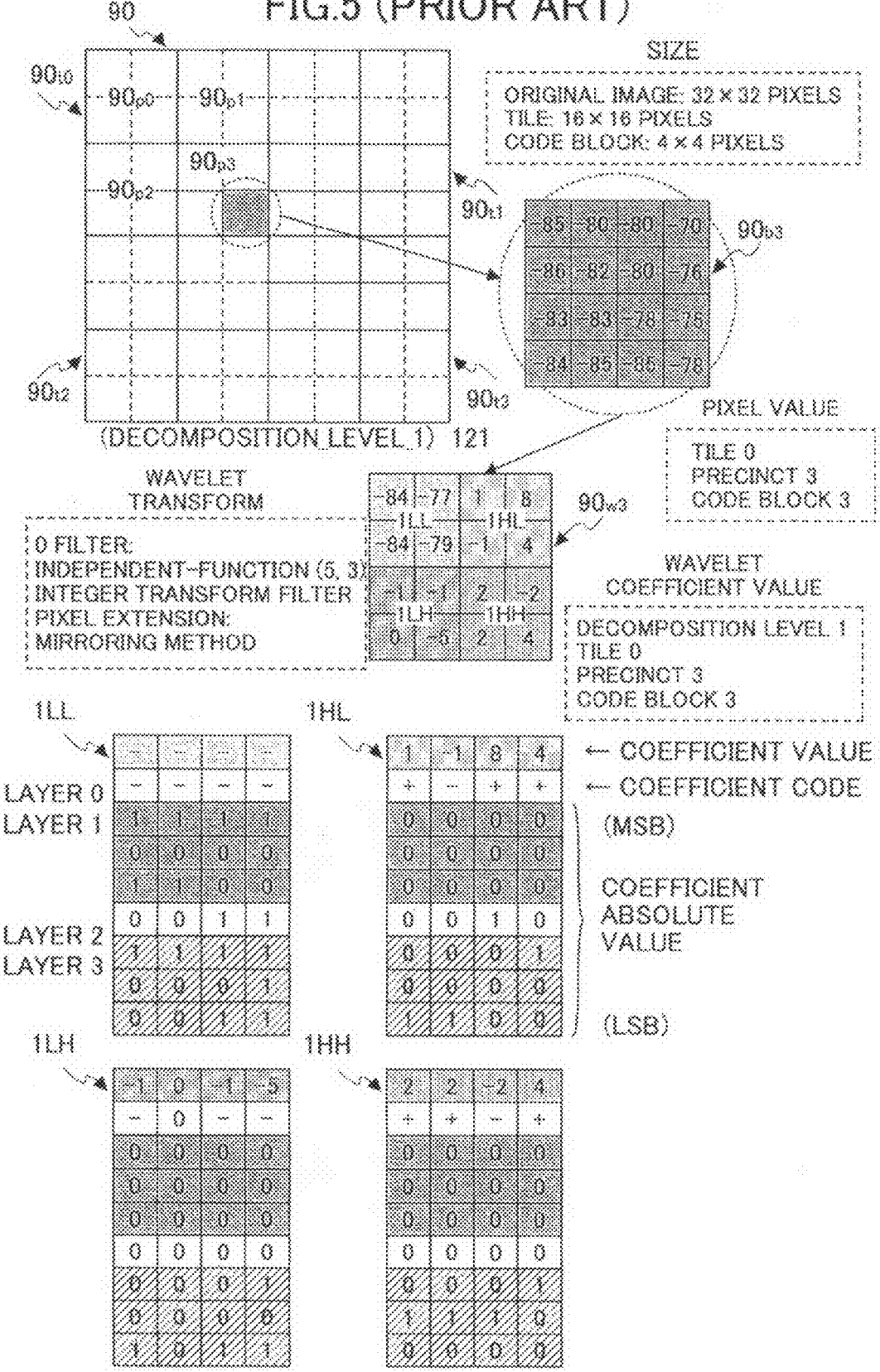
FIG. 5 is a diagram for illustrating the procedure for ordering bit-planes.

FIG. 5 is a diagram for illustrating the procedure for ordering the bit-planes. In the particular example shown in FIG. 5, an original image 90 (32×32 pixels) is divided into 4 tiles $90_{t0}$, $90_{t1}$, $90_{t2}$ and $90_{t3}$ each having 16×16 pixels. The sizes of the code block and the precinct at the decomposition level 1 (121) respectively are 4×4 pixels and 8×8 pixels. The numbers of the precincts and the code blocks are assigned in a raster sequence. In this particular example, numbers 0 to 3 are assigned to the precincts, such as $90_{p0}$, $90_{p1}$, $90_{p2}$, and $90_{p3}$, and numbers 0 to 3 are assigned to the code blocks, such as $90_{b3}$. A mirroring method is used for the pixel expansion with respect to the outside of the tile boundary, and the wavelet transform is carried out by an independent-function (5,3) integer transform filter to obtain the wavelet coefficients of the decomposition level 1 (121).

In addition, FIG. 5 also generally shows the typical layer structure for the tile $90_{t0}$ (tile 0), precinct $90_{p3}$ (precinct 3) and the code block $90_{b3}$ (code block 3). A code block $90_{w3}$ after the transform is obtained by subjecting the code block $90_{b3}$ to the wavelet transform by the independent-function (5, 3) integer transform filter and obtaining the wavelet coefficient values of the decomposition level 1. The code block $90_{w3}$ after the transform is vided into the sub-bands (1LL, 1HL, 1LH, 1HH), and the wavelet coefficient values are allocated to each of the sub-bands.

The layer structure is easier to understand when the wavelet coefficient values are viewed from a horizontal direction (bit-plane direction). One layer is made up of an arbitrary number of bit-planes. In this example, each of the layers 0, 1, 2 and 3 is made up of the bit-planes 1, 3, 1 and 3. The layer that includes a bit-plane closer to the LSB becomes the quantizing target earlier, and the layer including the bit-plane closer to the MSB becomes the quantizing target later and remains unquantized to the last. The method of discarding the layer closer to the LSB is called truncation, and the quantization rate can finely be controlled by this truncation.

In the entropy coding unit 104 shown in FIG. 1, the coding with respect to the tiles of each of the components is carried out by probability estimation from the context and target bits. Hence, the coding process is carried out in units of tiles for all of the components of the original image. Finally, the tag processing unit 105 carries out a process of connecting all code data from the entropy coding unit 104 into one code stream and adding a tag to this code stream.

Figure 6:
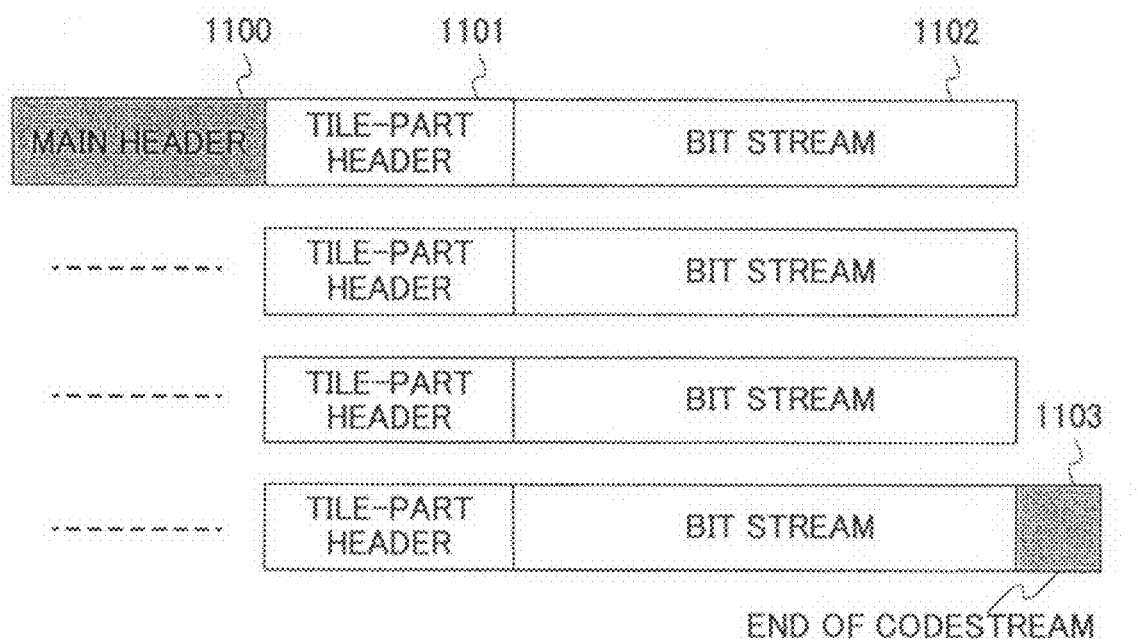
FIG. 6 is a simplified diagram showing an example of a code stream structure.
Figure 7:
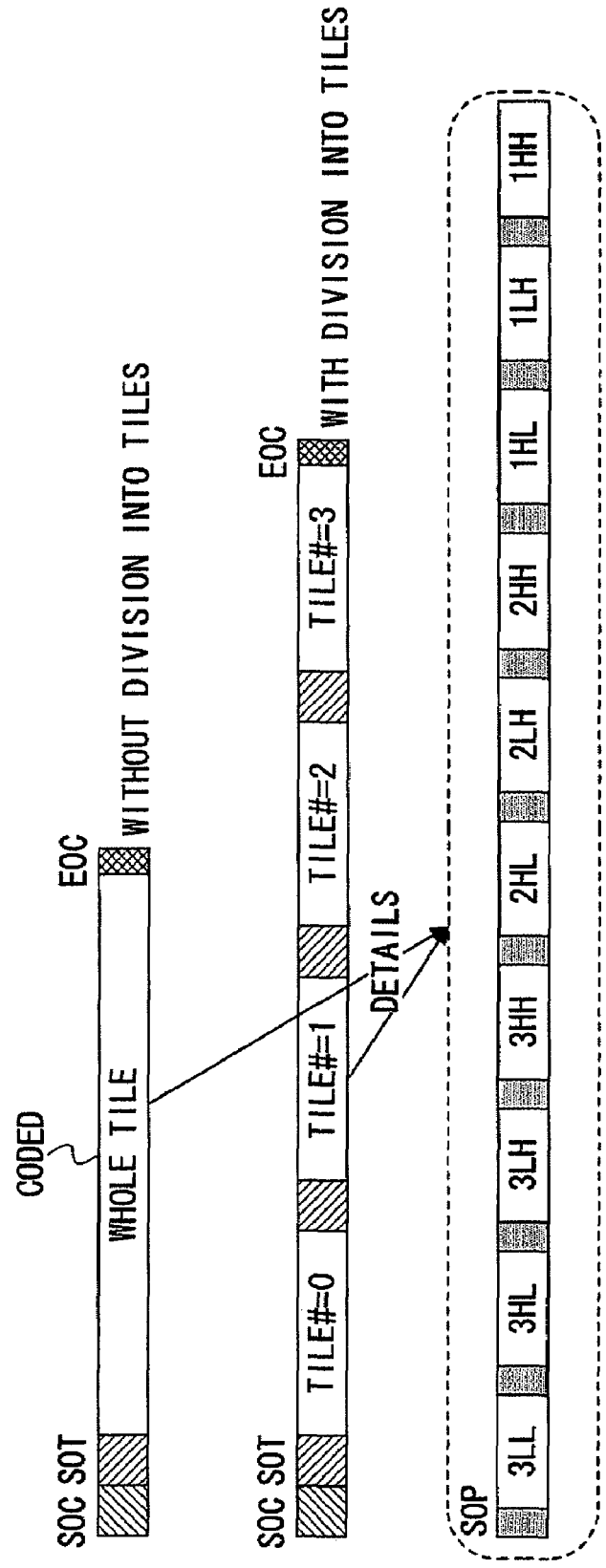
FIG. 7 is a diagram showing a code stream structure showing packets that accommodate coded wavelet coefficients, for each sub-band.

FIG. 6 is a simplified diagram showing an example of the code stream structure. As shown in FIG. 6, tag information called a header is added to the head of the code stream and to the head of the partial tile forming each tile. A main header 1100 is added to the head of the code stream, and a tile-part header 1101 is added to the head of the partial file. The coded data (bit stream 1102) of each tile follows the tile-part header 1101. An end tag 1103 is also added to the end of the code stream. FIG. 7 is a diagram showing a code stream structure showing packets that accommodate coded wavelet coefficients, for each sub-band. As shown in FIG. 7, a similar packet sequence structure is obtained regardless of whether the division into the tiles is not carried out as indicated by the upper part of FIG. 7 or the division into the tiles is carried out as indicated by the middle part of FIG. 7. The lower part of FIG. 7 shows the details of the code sequence for the tile. In FIG. 7, SOC indicates the start of code stream, EOC indicates the end of code stream, SOT indicates the start of tile, and SOP indicates the start of packet.

On the other hand, at the time of the decoding, contrary to that at the time of the coding, the image data is generated from the code stream of each tile of each component, as will now be described briefly in conjunction with FIG. 1. In this case, the tag processing unit 105 interprets the tag information added to the code stream which is input from the outside, decomposes the code stream into the code stream of each tile 112 of each component 111, and carries out the decoding process (expansion process) for every code stream of each tile 112 of each component 111. The position of the bit that is the target of the decoding is determined by the order based on the tag information within the code stream, and the quantization and inverse quantization unit 103 generates the context from the arrangement of the peripheral bits (which have already been decoded) of the target bit position. The entropy coding and decoding unit 104 carries out a decoding according to the probability estimation from the context and the code stream to generate the target bit, and the target bit is written at the target bit position. The data decoded in this manner has been spatially divided for every frequency band. Hence, the decoded data is subjected to a two-dimensional wavelet inverse transform in the two-dimensional wavelet transform and inverse transform unit 102, in order to restore each tile 112 of each component 111 of the image data. The restored data is transformed into the original colorimetric system data by the color space transform and inverse transform unit 101. As a result, an expanding unit (or expanding function or procedure) is realized.

Next, a description will be given of one embodiment of the image processing apparatus. This embodiment of the image processing apparatus employs one embodiment of a computer-readable storage medium according to one embodiment of the present invention. For the sake of convenience, it is assumed that this embodiment uses the image compression and expansion technique typified by the JPEG2000. However, the present invention is of course not limited to the JPEG2000.

This embodiment of the computer-readable storage medium stores an image processing program for causing a computer to carry out the image processing which will be described hereunder, and more particularly, the hierarchical image data coding. Any type of recording media capable of storing the program in a computer-readable manner may be used for the computer-readable storage medium. For example, the recording medium forming the computer-readable storage medium may be selected from magnetic, optical and magneto-optic recording media and semiconductor memory devices, which may be portable.

Figure 8:
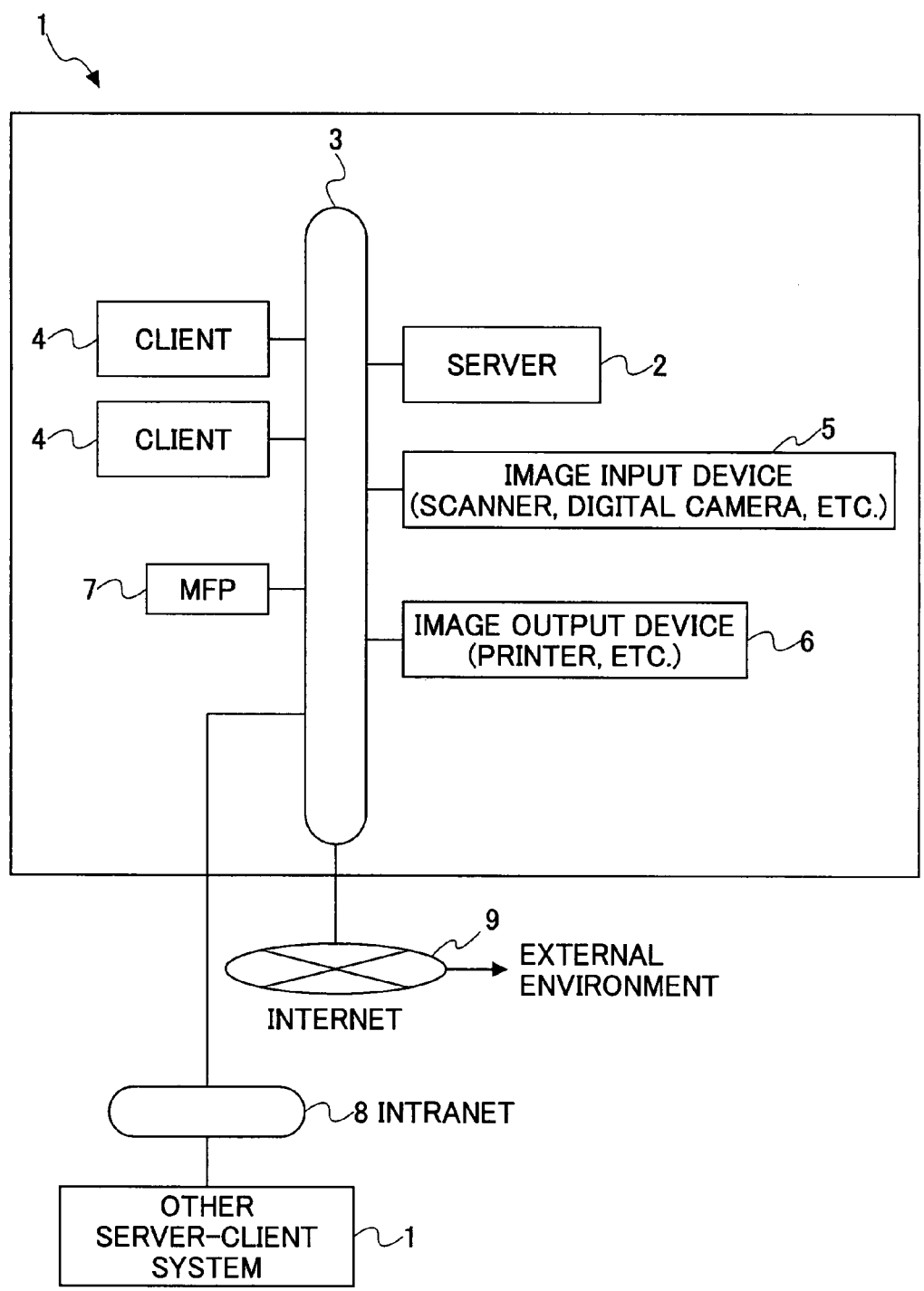
FIG. 8 is a diagram showing an image data processing system to which one embodiment of an image processing apparatus according to one embodiment of the present invention may be applied.

FIG. 8 is a diagram showing an image data processing system to which one embodiment of the image processing apparatus may be applied. The image data processing system shown in FIG. 8 forms a server-client system 1 including a server computer 2 and a plurality of client computers 4 which are coupled via a network 3 which as a local area network (LAN). In the server-client system 1, an image input device 5, such as a scanner and a digital camera, and an image output device 6, such as a printer, can be shared via the network 3. A multi-function peripheral (MFP) 7 which functions as the image input device 5 and/or the image output device 6 might be connected to the network 3. The server computer 2, the client computers 4, the image input device 5, the image output device 6 and the MFP 7 each form an electronic equipment.

The server-client system 1 described above may be connected to another server-client system 1 via an intranet 8, for example, so that data communications may be made between the two server-client systems 1. The server-client system 1 may also be connected to an Internet communication network 9 so that data communications may be made between the server-client system 1 and an external environment (external apparatus).

Each client computer 4 may be formed by a personal computer (PC), a portable information terminal equipment such as a personal digital assistant (PDA), and the like. In addition, the MFP 7 may function as the client computer 4.

Figure 9:
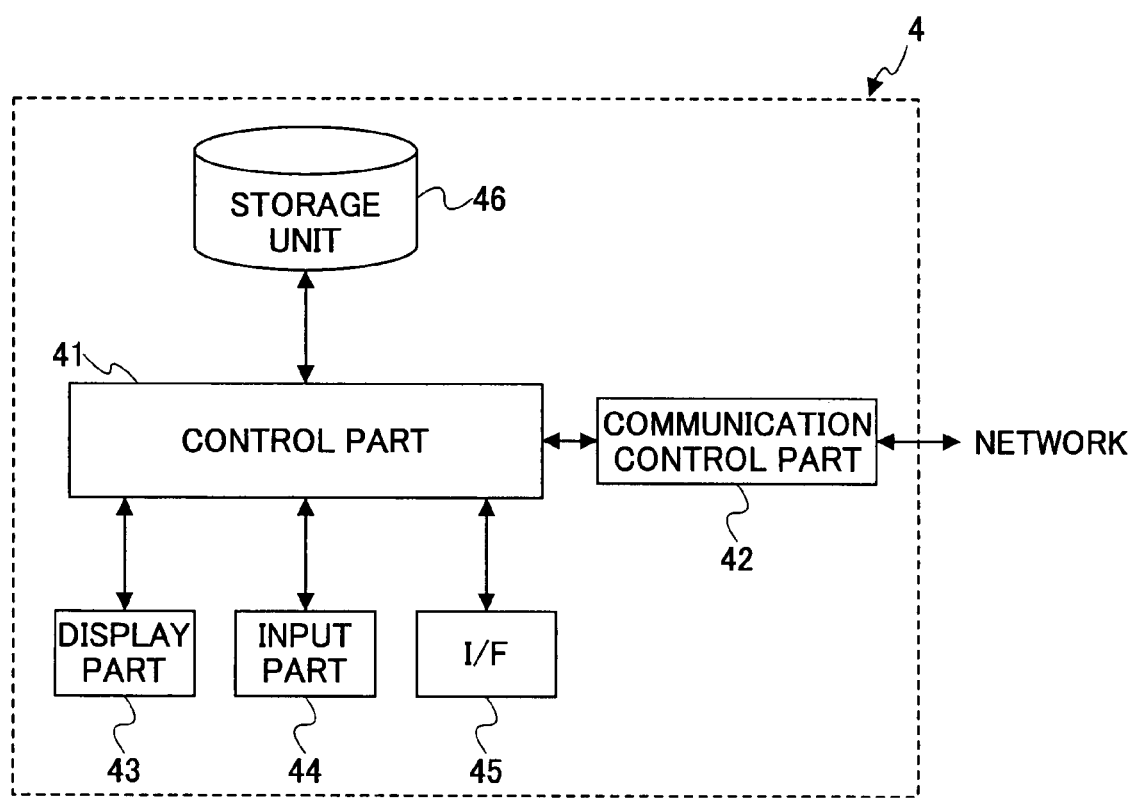
FIG. 9 is a system block diagram showing electrical connections within a client computer.

Next, a description will be given of the client computer 4, by referring to FIG. 9. FIG. 9 is a system block diagram showing electrical connections within the client computer 4. As shown in FIG. 9, the client computer 4 includes a control unit 41, and a communication control unit 42, a display unit 43, an input unit 44, an interface (I/F) unit 45 and a storage unit 46 which are connected to the control unit 41.

The control unit 41 is formed by a CPU which centrally controls various parts of the client computer 4, a ROM which stores various programs including the image processing program, and a RAM which forms a work area for the CPU. The storage unit 46 is formed by a hard disk drive (HDD) or the like which stores various programs and various data. The program stored in the storage unit 46 may be different for each client computer 4, so that each client computer 4 may carry out functions peculiar thereto depending on the different programs stored in the storage units 46 of the client computers 4.

The display unit 43 is formed by a cathode ray tube (CRT), a liquid crystal display (LCD) or the like which displays various information under the control of the control unit 41. The input unit 44 is formed by a keyboard, a mouse or the like which is operated by an operator (user) to input various information and instructions to the control unit 41. I/F unit 45 provides an interface between the client computer 4 and an external apparatus.

Figure 10:
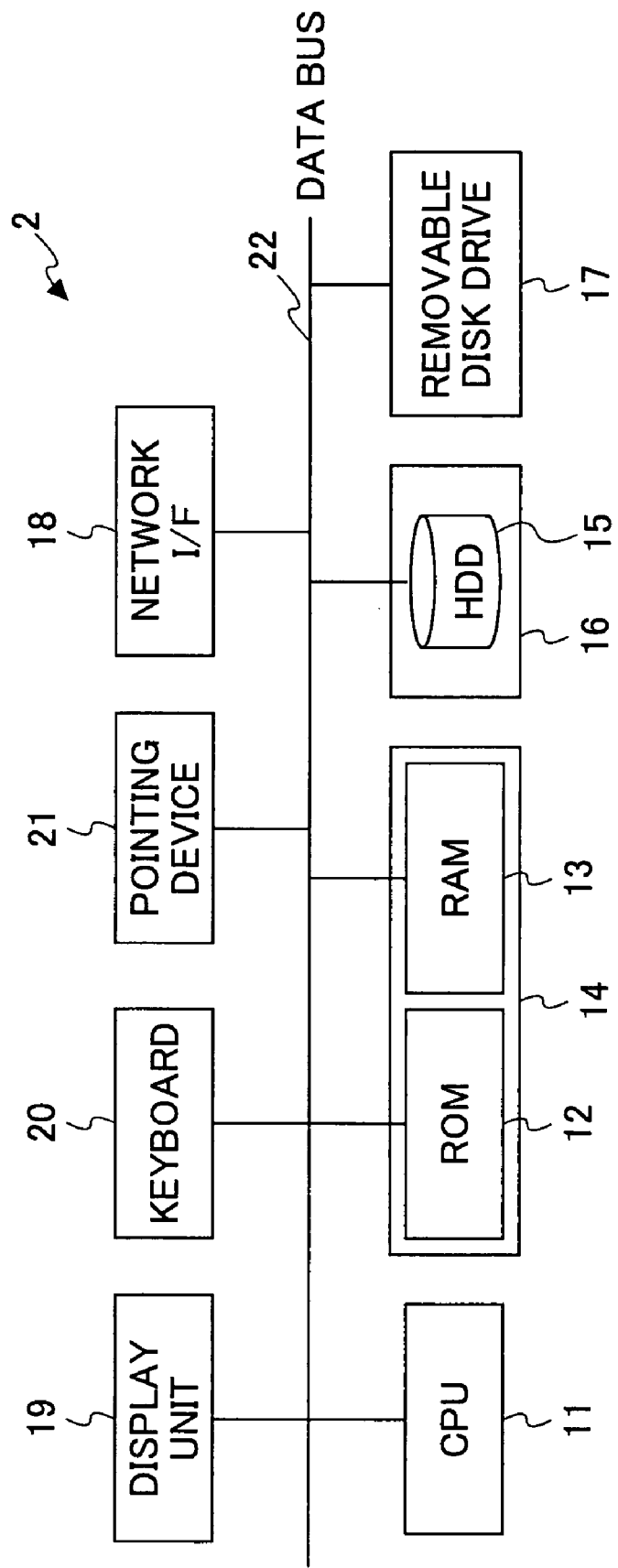
FIG. 10 is a system block diagram showing electrical connections of a server computer which functions as the image processing apparatus.

Next, a description will be given of the server computer 2, by referring to FIG. 10. FIG. 10 is a system block diagram showing electrical connections of the server computer 2 which functions as the image processing apparatus. As shown in FIG. 10, the server computer 2 includes a CPU 11, a primary storage unit 14, a secondary storage unit 16, a removable disk drive 17, a network interface (I/F) unit 18, a display unit 19, a keyboard 20 and a pointing device 21 which are connected via a data bus 22.

The CPU 11 controls various parts of the server computer 2, and carries out various information processing including the image data processing that will be described later. The primary storage unit includes a RAM 13 and a ROM 14 that stores information. The secondary storage unit 16 includes a HDD 15 that stores the compressed codes which will be described later. The removable disk drive 17 is formed by a CD-ROM drive or the like which stores information to be distributed outside the server computer 2 and information obtained from outside the server computer 2. The network I/F unit 18 provides an interface between the server computer 2 and an external apparatus, in order to enable communications between the server computer 2 and the external apparatus such as the image input device 5 via the network 3. The display unit 19 is formed by a CRT, an LCD or the like and displays various information, such as processes and results, to the user. The keyboard 20 and the pointing device 21 are operated by the user to input various information and instructions to the CPU 11. A bus controller (not shown) may be connected to the data bus 22 to carry out an arbitration with respect to the data that is exchanged among the various elements connected to the data bus 22.

When the user turns ON the power of the server computer 2, the CPU 11 starts a loader program within the ROM 12, and an operating system (OS) for managing hardware and software of the server computer 2 is read from the HDD 15 and stored in the RAM 13, in order to start the operating system. The operating system starts a program, reads information and/or stores information, in response to an operation carried out by the user. Typical operating systems are the Windows (registered trademark) and UNIX (registered trademark). Programs that run on the operating system are often referred to as application programs.

The server computer 2 stores the image processing program in the HDD 15, as the application program. Hence, in this embodiment, the HDD 15 forms and functions as the computer-readable storage medium which stores the image processing program.

Generally, the program which is installed in the secondary storage unit 16 of the server computer 2, such as the HDD 15, is stored in a magnetic recording medium such as a floppy disk (FD) or an optical recording medium such as a CD-ROM and a DVD-ROM, and the program stored in such a recording medium is installed in the secondary storage unit 16 such as the HDD 15. For this reason, portable recording media, including optical recording media such as the CD-ROM, magneto-optic recording media such as the magneto-optic disk, and magnetic recording media such as the floppy disk, may form the computer-readable storage medium which stores the image processing program. Furthermore, the image processing program may be obtained from an external apparatus via the network I/F unit 18 and installed in the secondary storage unit 16 such as the HDD 15.

When the image processing program that runs on the operating system is started, the CPU 11 of the server computer 2 carries out various operations according to the image processing program, to centrally control various parts of the server computer 2. Of the various operations carried out by the CPU 11 of the server computer 2, a description will now be given of the important operations that are carried out in this embodiment.

Figure 11:
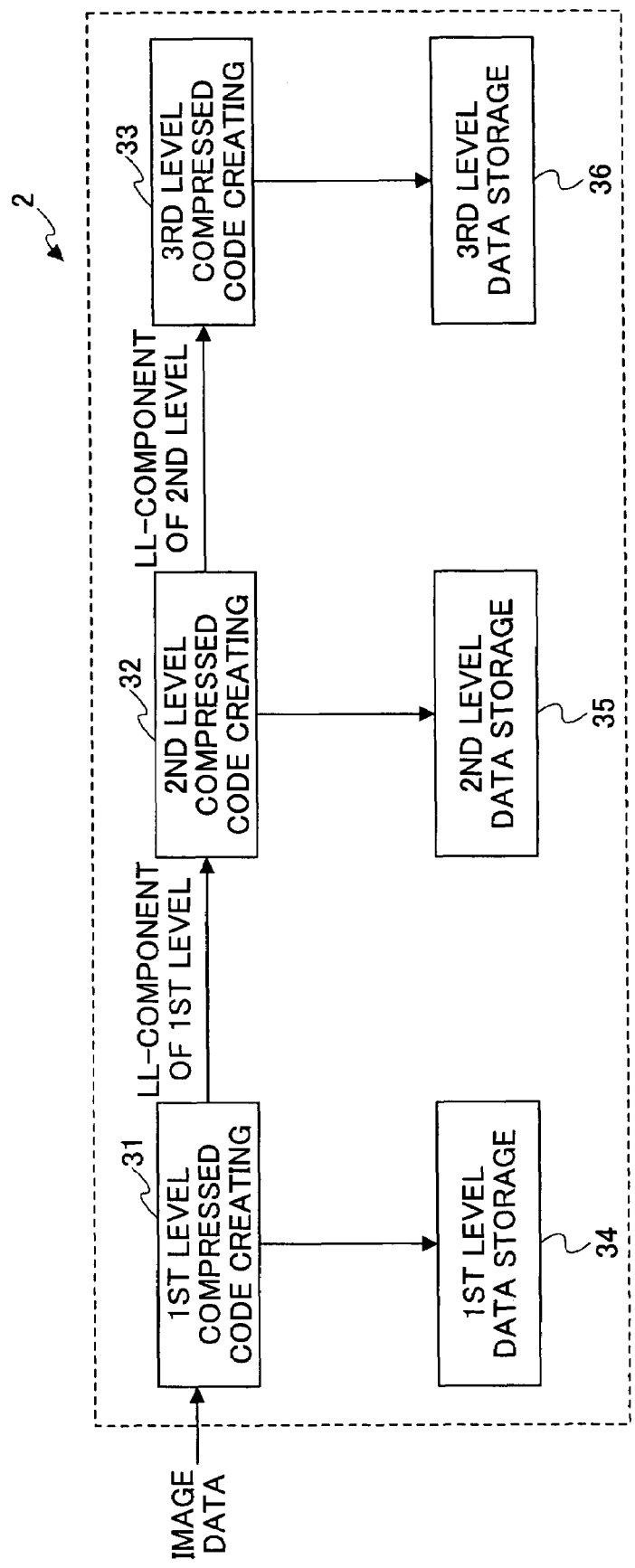
FIG. 11 is a functional block diagram for illustrating functions carried out by a CPU based on an image processing program in one embodiment of the present invention.

A description will be given of the important operations carried out by the CPU 11 of the server computer 2 in this embodiment, by referring to FIG. 11. FIG. 11 is a functional block diagram for illustrating functions carried out by the CPU 11 based on the image processing program in one embodiment. The functions of first, second and third hierarchical layer (first, second and third level) compressed code creating units 31, 32 and 33, and first, second and third hierarchical layer (first, second and third level) data storage units 34, 35 and 36 shown in FIG. 11, are realized by the operations carried out by the CPU 11 of the server computer 2. When satisfactory real-time processing is to be made, the processing needs to be carried out at a high speed. Hence, in this case, it is desirable to separately provide logic circuits (not shown), in order to realize the various functions by the operations of the logic circuits.

The first, second and third level compressed code creating units 31, 32 and 33 basically compress and code the input image data from the image input device 5 or the like according to the JPEG2000 algorithm. The compression process according to the JPEG2000 algorithm was described above with reference to the color space transform and inverse transform unit 101, the two-dimensional wavelet transform and inverse transform unit 102, the quantization and inverse quantization unit 103, the entropy coding and decoding unit 104, and the tag processing unit 105 shown in FIG. 1. Hence, a description of the compression process according to the JPEG2000 algorithm will be omitted. When the compression process according to the JPEG2000 algorithm is carried out, the compressed codes are created for each hierarchical layer (level) corresponding to the octave division in the DWT. In this embodiment, the compressed codes of 3 hierarchical layers (levels) are created.

The first level compressed code creating unit 31 creates the compressed codes of the highest hierarchical layer (first level), and supplies the multi-level image of the LL-component that is band-decomposed by the DWT to the second level compressed code creating unit 32 that creates the compressed codes of a lower hierarchical layer. The second level compressed code creating unit 32 creates the compressed codes of the next highest hierarchical layer (second level), and supplies the multi-level image of the LL-component that is band-decomposed by the DWT to the third level compressed code creating unit 33 that creates the compressed codes of a lower hierarchical layer. The third level compressed code creating unit 33 creates the compressed codes of the lowest hierarchical layer (third level).

In other words, the first through third level compressed code creating units 31 through 33 form a hierarchical coding unit for compressing and coding the image data in a state divided into each of the hierarchical layers (levels).

The compressed codes of each of the hierarchical layers (levels) created in the first, second and third level compressed code creating units 31, 32 and 33 are supplied to corresponding first, second and third level data storage units 34, 35 and 36.

The first level data storage unit 34 stores the compressed codes of the highest hierarchical layer (first level) supplied from the first level compressed code creating unit 31 into the HDD 15 of the server computer 2. The second level data storage unit 35 stores the compressed codes of the second highest hierarchical layer (second level) supplied from the second level compressed code creating unit 32 into the storage unit 46 of the client computer 4. The third level data storage unit 36 stores the compressed codes of the lowest hierarchical layer (third level) supplied from the third level compressed code creating unit 33 into the storage unit 46 of a client computer 4 which is other than the client computer 4 which stores the compressed codes of the second hierarchical layer (level).

In other words, the first through third level data storage units 34 through 36 form a distributed storage unit for distributively storing the compressed codes which are divided into each of the hierarchical layers (levels).

Of course, the compressed code creating units and the level data storage units are not limited to 3 hierarchical layers (levels) as described above, and may be provided for n hierarchical layers (levels), where n=1, 2, 3 . . . .

FIG. 12 is a diagram showing compressed codes stored by the first through third level hierarchical layer data storage units 34 through 36. FIG. 12 shows a case where the first through third level data storage units 34 through 36 store the compressed codes (sub-bands) for the decomposition levels 1 through 3 shown in FIG. 3 in an overlapping manner. As shown in FIG. 12, the first level data storage unit 34 stores the sub-bands 1LL, 1HL, 1LH and 1HH of the decomposition level 1 in the HDD 15 of the server computer 2. The second level data storage unit 35 stores the sub-bands 2LL, 2HL, 2LH and 2HH of the decomposition level 2 in the storage unit 46 of the client computer 4. The third level data storage unit 36 stores the sub-bands 3LL, 3HL, 3LH and 3HH of the decomposition level 3 in the storage unit 46 of a client computer 4 which is other than the client computer 4 storing the sub-bands 2LL, 2HL, 2LH and 2HH of the decomposition level 2. In is case, regardless of the decomposition level (any of the decomposition levels 1 through 3) of the compressed image to be demodulated, the desired image can be obtained by demodulating the compressed codes read from one storage unit (HDD 15 or storage unit 46), that is, from the storage unit provided at one location. As a result, it is possible to obtain the desired image at a high speed.

FIG. 13 is a diagram showing other compressed codes stored by first through third level data storage units 34 through 36. FIG. 13 shows a case where the first through third level data storage units 34 through 35 store the compressed codes (sub-bands) for the decomposition levels 1 through 3 shown in FIG. 3 in a non-overlapping manner. As shown in FIG. 13, the first level data storage unit 34 stores the sub-bands 1HL, 1LH and 1HH of the decomposition level 1 in the HDD 15 of the server computer 2. The second level data storage unit 35 stores the sub-bands 2HL, 2LH and 2HH of the decomposition level 2 in the storage unit 46 of the client computer 4. The third level data storage unit 36 stores the sub-bands 3LL, 3HL, 3LH and 3HH of the decomposition level 3 in the storage unit 46 of a client computer 4 which is other than the client computer 4 storing the sub-bands 2LL, 2HL, 2LH and 2HH of the decomposition level 2. It is unnecessary to separately store the sub-band 2LL because the sub-band 2LL can be generated from the sub-bands 3LL, 3HL, 3LH and 3HH. Similarly, it is unnecessary to separately store the sub-band 1LL because the sub-band 1LL can be generated from 2LL (3LL, 3HL, 3LH and 3HH), 2HL, 2LH and 2HH. In this case, it is possible to reduce the storage capacity required to store the compressed codes, compared to the case shown in FIG. 12.

When demodulating the compressed image of the decomposition level 3, the desired image can be obtained by demodulating the compressed codes read from one storage unit (storage unit 46), that is, from the storage unit provided at one location. When demodulating the compressed image of the decomposition level 2, the desired image can be obtained by demodulating the compressed codes read from two storage units (two storage units 46). When demodulating the compressed image of the decomposition level 1, the desired image can be obtained by demodulating the compressed codes read from two storage units (HDD 15 and storage unit 46).

Therefore, according to this embodiment, the high-resolution images are stored in the HDD 15 of the server computer 2, and the low-resolution images are stored in plural stages into the storage units 46 of the client computers 4.

By distributively storing the compressed codes for each of the hierarchical layers (levels) in the server computer 2 and the client computers 4 (including MFP 7) that are distributed within the network 3, it is possible to realize a high-speed processing since the processing load at the time of creating the data and at the time of outputting the data such as displaying or printing the data can be distributed.

The required processes are reduced and a high-speed processing is realized by switching the apparatus (server computer 2, client computer 4 and MFP 7) that is accessed by the apparatus that displays, prints or communicates the data.

For example, in the case of a portable telephone, a PDA or the like having a limited display screen area, a reduced image display (thumbnail display) may be made. In this case, the apparatus (for example, storage unit 46 of each client computer 4) that stores the low-resolution image is accessed and displayed, of the apparatuses that store the data that are divided into each of the hierarchical layers (levels). When the display equipment (output device) such as the portable telephone and the PDA treats the apparatus (for example, the storage unit 46 of each client computer 4) that stores the low-resolution image as an apparatus that stores the first hierarchical layer (level) data, a display program for displaying the data can be used for the apparatus that is capable of displaying a large screen like the personal computer and for the apparatus that is only capable of displaying a small screen, without modifying the display program. For example, the third hierarchical layer (level) data may be treated as the first hierarchical layer (level) data and displayed on the portable telephone.

In this embodiment, the compressed codes are distributed for each of the hierarchical layers (levels) and stored in the server computer 2 and the client computers 4 (including MFP 7) that are distributed within the network 3. However, it is not essential to store the compressed codes that are distributed for each of the hierarchical layers (levels) in a plurality of apparatuses, and the compressed codes that are distributed for each of the hierarchical layers (levels) may be stored within a single apparatus, such as the server computer 2.

In a case where the compressed codes are distributed for each of the hierarchical layers (levels) and stored in the server computer 2 and the client computers 4 (including MFP 7) which are distributed within the network 3, the image data processing cannot be carried out unless the power of all of the concerned apparatuses (in this case, the computers 2 and 4) is turned ON. Hence, it is desirable to confirm that the power of all of the concerned apparatuses is turned ON before starting the image data processing. If the power of all of the concerned apparatuses is not turned ON, a determination such as not starting the image data processing may be made.

Because the compressed codes that are divided for each of the hierarchical layers (levels) are distributively stored, it is possible to distribute the processing load when creating the data and when outputting the data by displaying or printing the data. Therefore, a high-speed image data processing can be carried out.

Figure 14:
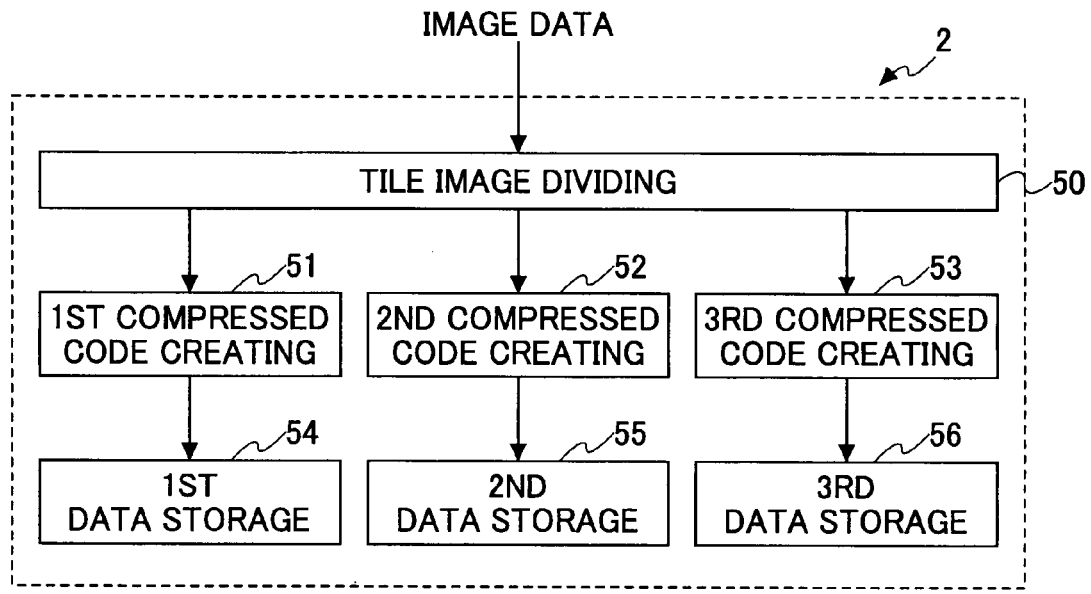
FIG. 14 is a functional block diagram for illustrating functions carried out by a CPU based on an image processing program in one embodiment of the image processing apparatus according to one embodiment of the present invention.

Next, a description will be given of another embodiment of the image processing apparatus according to one embodiment of the present invention, by first referring to FIG. 14. Those units that are the same as those corresponding units of one embodiment are designated by the same reference numerals, and a description thereof will be omitted. This embodiment of the image processing apparatus employs another embodiment of a computer-readable storage medium according to one embodiment of the present invention. In this embodiment, the functions realized by the operation of the CPU 11 of the server computer 2 are different from those of another embodiment of the invention.

A description will be given of the important operations carried out by the CPU 11 of the server computer 2 in this embodiment, by referring to FIG. 14. FIG. 14 is a functional block diagram for illustrating functions carried out by the CPU 11 based on the image processing program in one embodiment. The functions of a tile image dividing unit 50, first, second and third compressed code creating units 51, 52 and 53, and first, second and third data storage units 54, 55 and 56 shown in FIG. 14, are realized by the operations carried out by the CPU 11 of the server computer 2. When satisfactory real-time processing is to be made, the processing needs to be carried out at a high speed. Hence, in this case, it is desirable to separately provide logic circuits (not shown), in order to realize the various functions by the operations of the logic circuits.

The tile image dividing unit 50 divides the input image data from the image input device 5 or the like into a plurality of tiles (small regions). In this embodiment, it is assumed for the sake of convenience that the tile image dividing unit 50 divides the input image data into 3 tiles (small regions). The 3 tiles (small regions) are supplied to the corresponding first, second and third compressed code creating units, 51, 52 and 53.

The first, second and third compressed code creating units 51, 52 and 53 basically compress and code the tile images from the tile image dividing unit 50 according to the JPEG2000 algorithm. The compression process according to the JPEG2000 algorithm was described above with reference to the color space transform and inverse transform unit 101, the two-dimensional wavelet transform and inverse transform unit 102, the quantization and inverse quantization unit 103, the entropy coding and decoding unit 104, and the tag processing unit 105 shown in FIG. 1. Hence, a description of the compression process according to the JPEG2000 algorithm will be omitted.

The tile image dividing unit 50 and the first through third compressed code creating units 51 through 53 form a rectangular region coding unit for compressing and coding the image data in a state divided for each of the rectangular regions.

The compressed codes of each of the hierarchical layers (levels) created by the first, second and third compressed code creating units 51, 52 and 53 are supplied to the corresponding first, second and third data storage units 54, 55 and 56.

The first data storage unit 54 stores the compressed codes of the tile image supplied from the first compressed code creating unit 51 into the HDD 15 of the server computer 2. The second data storage unit 55 stores the compressed codes of the tile image supplied from the second compressed code creating unit 52 into the storage unit 46 of the client computer 4. The third data storage unit 56 stores the compressed codes of the tile image supplied from the third compressed code creating unit 53 into the storage unit 46 of a client computer 4 that is other than the client computer 4 used by the second data storage unit 55.

In other words, the first through third data storage units 54 through 56 form a distributed storage unit for distributively storing the compressed codes that are divided into each of the rectangular regions.

Of course, the number of the compressed code creating units and the number of the data storage units are not limited to 3 as described above, and n compressed code creating units and n data storage units may be provided, where n=1, 2, 3.

Figure 15:
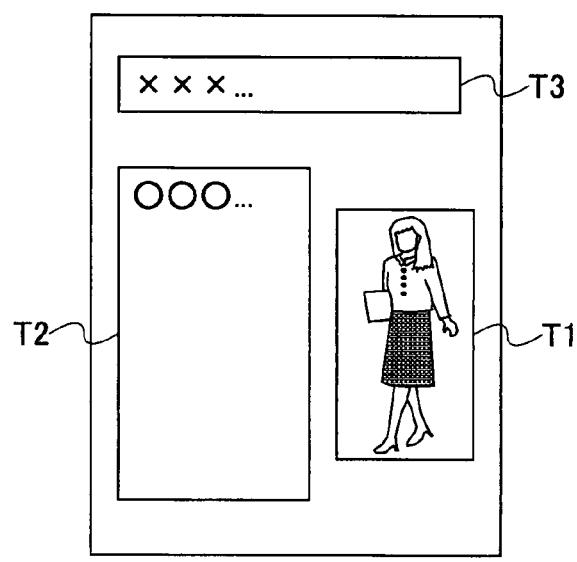
FIG. 15 is a diagram for illustrating a division of a tile image.

FIG. 15 is a diagram for illustrating a division of a tile image. FIG. 15 shows a case where the tile image dividing unit 50 divides a document image data into 3 tiles T1 through T3 depending on the type of region (or type of image data). In this case, if the type of region is "picture (photograph or the like)," the region is regarded as the tile T1. The tile T1 is coded into the compressed codes (sub-bands) 1LL, 1HL, 1LH and 1HH of the decomposition level 1 shown in FIG. 3 by the first compressed code creating unit 51, and stored in the HDD 15 of the server computer 2 by the first data storage unit 54. If the type of region is "character," this region is regarded as the tile T2. The tile T2 is coded into the sub-bands 2LL, 2HL, 2LH and 2HH of the decomposition level 2 by the second compressed code creating unit 52, and stored in the storage unit 46 of the client computer 4 by the second data storage unit 55. In addition, if the type of region is "title," this region is regarded as the tile T3. The tile T3 is coded into the sub-bands 3LL, 3HL, 3LH and 3HH of the decomposition level 3 by the third compressed code creating unit 53, and stored in the storage unit 46 of a client computer 4 that is other than the client computer 4 that stores the compressed codes of the tile T3, by the third data storage unit 56. In this case, it is possible to suppress the storage capacity required to store the compressed codes of the tiles T1 through T3 to a small value.

Figure 16:
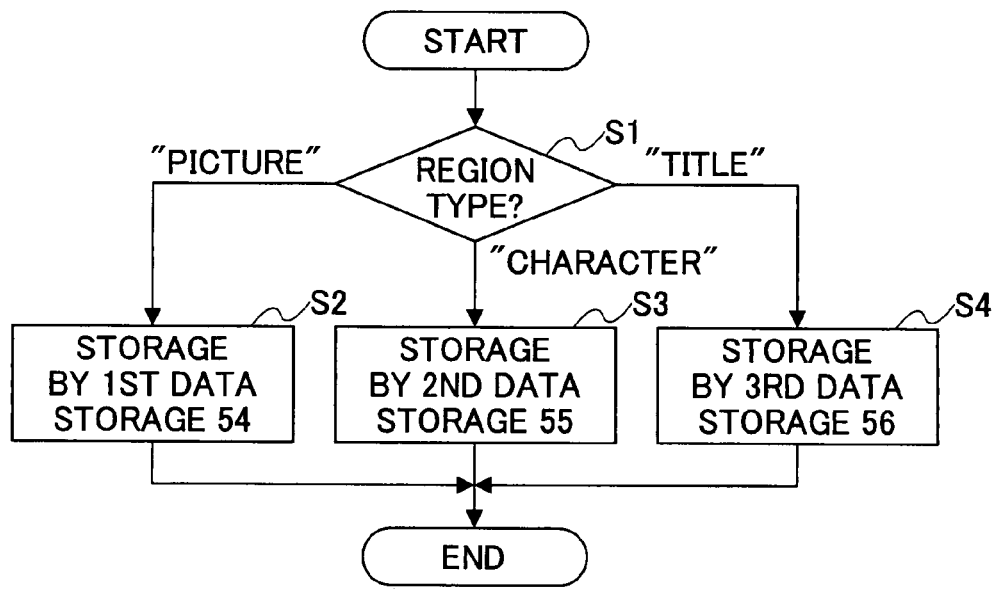
FIG. 16 is a flow chart for illustrating storage of the compressed codes depending on a type of region.

FIG. 16 is a flow chart for illustrating storage of the compressed codes depending on the type of region. The process shown in FIG. 16 is carried out by the CPU 11 of the server computer 2. In FIG. 16, a step S1 decides whether the type of region of the document image data to be stored is the "title," "character" or "picture (photograph or the like)." The type of region may be determined by known methods, such as a determination based on information which is related to the type of region and is input by the user from the input unit 44 of the client computer 4, a determination based on a position of the region within the document image, and a determination based on a label added to the document image data and indicating the type of each region within the document image. If the type of region is "picture (photograph or the like)," a step S2 regards this region as the tile T1, codes the tile T1 into the compressed codes (sub-bands) 1LL, 1HL, 1LH and 1HH of the decomposition level 1 shown in FIG. 3 by the first compressed code creating unit 51, and stores the compressed codes 1LL, 1HL, 1LH and 1HH in the HDD 15 of the server computer 2 by the first data storage unit 54. If the type of region is "character," a step S3 regards this region as the tile T2, codes the tile T2 into the sub-bands 2LL, 2HL, 2LH and 2HH of the decomposition level 2 by the second compressed code creating unit 52, and stores the sub-bands 2LL, 2HL, 2LH and 2HH in the storage unit 46 of the client computer 4 by the second data storage unit 55. In addition, if the type of region is "title," a step S4 regards this region as the tile T3, codes the tile T3 into the sub-bands 3LL, 3HL, 3LH and 3HH of the decomposition level 3 by the third compressed code creating unit 53, and stores the sub-bands 3LL, 3HL, 3LH and 3HH in the storage unit 46 of a client computer 4 that is other than the client computer 4 that stores the compressed codes of the tile T3, by the third data storage unit 56.

Figure 17:
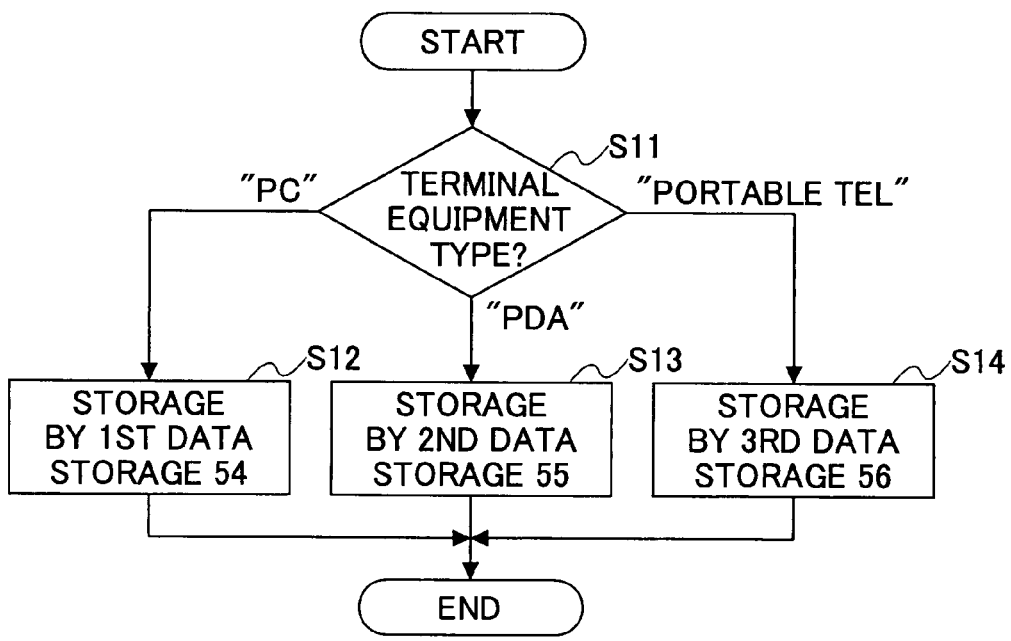
FIG. 17 is a flow chart for illustrating storage of the compressed codes depending on a type of client computer.

FIG. 17 is a flow chart for illustrating storage of the compressed codes depending on the type of client computer. The process shown in FIG. 17 is carried out by the CPU 11 of the server computer 2. In FIG. 17, a step S11 decides whether a source of the image data to be stored, that is, a source information terminal equipment, is a personal computer (PC), a portable information terminal equipment (PDA) or a portable telephone. The type of source information terminal equipment may be determined by known determination methods. For example, the type of source information terminal equipment may be determined from an electronic mail (e-mail) address to determine a provider via which the image data was transmitted. In addition, the type of source information terminal equipment may be determined by sending dummy data to the source and confirming a communication rate from returned information from the source. Of course, the type of information terminal equipment is not limited to the type of equipment itself, and any distinguishable information (types) may be used, such as a model of the equipment, a communication rate of the equipment, and a size of a display screen or area.

If the type of source information terminal equipment is the portable telephone, a step S12 regards the region of the image data to be stored as the tile T1, codes the tile T1 into the compressed codes (sub-bands) 1LL, 1HL, 1LH and 1HH of the decomposition level 1 shown in FIG. 3 by the first compressed code creating unit 51, and stores the compressed codes 1LL, 1HL, 1LH and 1HH in the HDD 15 of the server computer 2 by the first data storage unit 54. If the type of source information terminal equipment is the PDA, a step S13 regards the region of the image data to be stored as the tile T2, codes the tile T2 into the sub-bands 2LL, 2HL, 2LH and 2HH of the decomposition level 2 by the second compressed code creating unit 52, and stores the sub-bands 2LL, 2HL, 2LH and 2HH in the storage unit 46 of the client computer 4 by the second data storage unit 55. In addition, if the type of source information terminal equipment is the personal computer (PC), a step S14 regards the region of the image data to be stored as the tile T3, codes the tile T3 into the sub-bands 3LL, 3HL, 3LH and 3HH of the decomposition level 3 by the third compressed code creating unit 53, and stores the sub-bands 3LL, 3HL, 3LH and 3HH in the storage unit 46 of a client computer 4 that is other than the client computer 4 that stores the compressed codes of the tile T3, by the third data storage unit 56.

Figure 18:
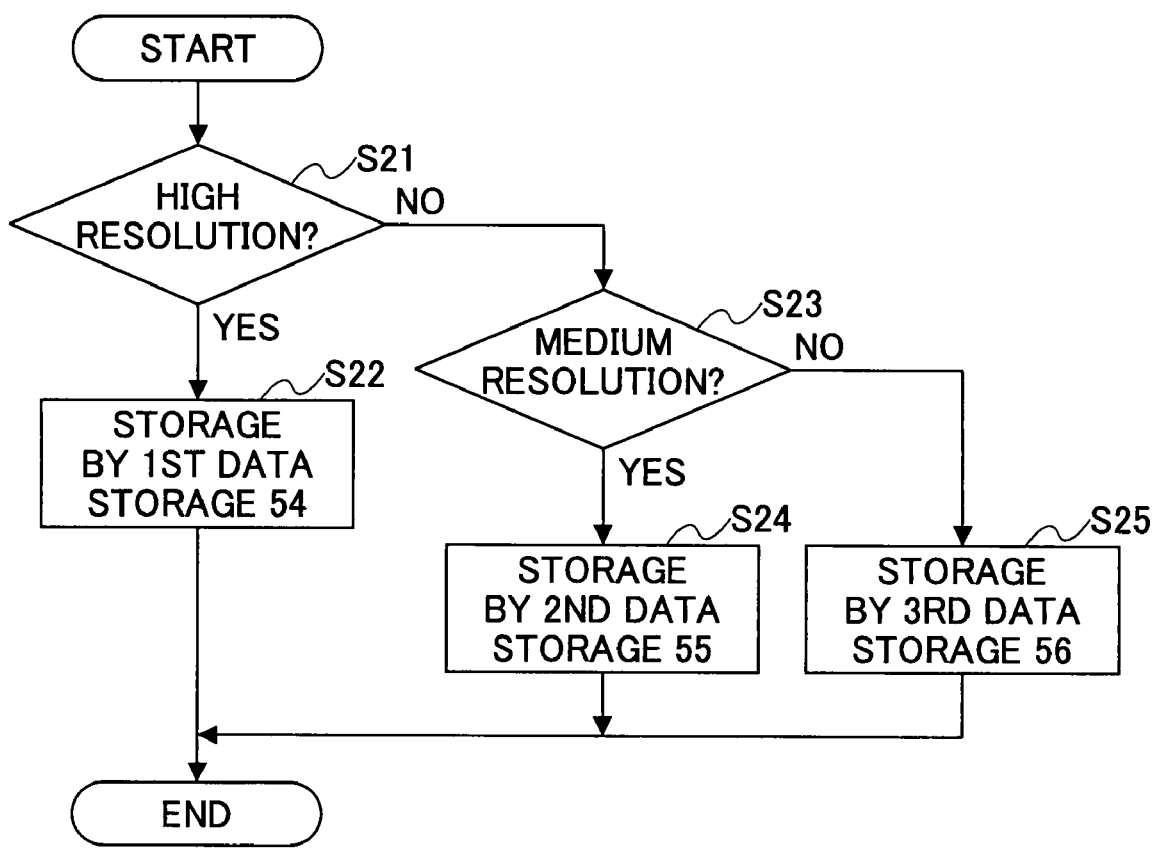
FIG. 18 is a flow chart for illustrating storage of the compressed codes depending on a user selection.

FIG. 18 is a flow chart for illustrating storage of the compressed codes depending on the user selection. The process shown in FIG. 18 is carried out by the CPU 11 of the server computer 2. This embodiment determines whether the storage method for the image data to be stored is set to high resolution, medium resolution or low resolution, based on an instruction related to the selection of the storage method input by the user from the input unit 44 of the client computer 4. A step S21 decides whether or not the storage method is set to the high resolution. If the decision result in the step S21 is YES, a step S22 regards the region of the image data to be stored as the tile T1, codes the tile T1 into the compressed codes (sub-bands) 1LL, 1HL, 1LH and 1HH of the decomposition level 1 shown in FIG. 3 by the first compressed code creating unit 51, and stores the compressed codes 1LL, 1HL, 1LH and 1HH in the HDD 15 of the server computer 2 by the first data storage unit 54.

If the decision result in the step S21 is NO, a step S23 decides whether or not the storage method is set to the medium resolution. If the decision result in the step S23 is YES, a step S24 regards the region of the image data to be stored as the tile T2, codes the tile T2 into the sub-bands 2LL, 2HL, 2LH and 2HH of the decomposition level 2 by the second compressed code creating unit 52, and stores the sub-bands 2LL, 2HL, 2LH and 2HH in the storage unit 46 of the client computer 4 by the second data storage unit 55. In addition, if the decision result in the step S23 is NO, it is determined that the storage method is set to the low resolution, and the process advances to a step S25. The step S25 regards the region of the image data to be stored as the tile T3, codes the tile T3 into the sub-bands 3LL, 3HL, 3LH and 3HH of the decomposition level 3 by the third compressed code creating unit 53, and stores the sub-bands 3LL, 3HL, 3LH and 3HH in the storage unit 46 of a client computer 4 that is other than the client computer 4 that stores the compressed codes of the tile T3, by the third data storage unit 56.

Figure 19:
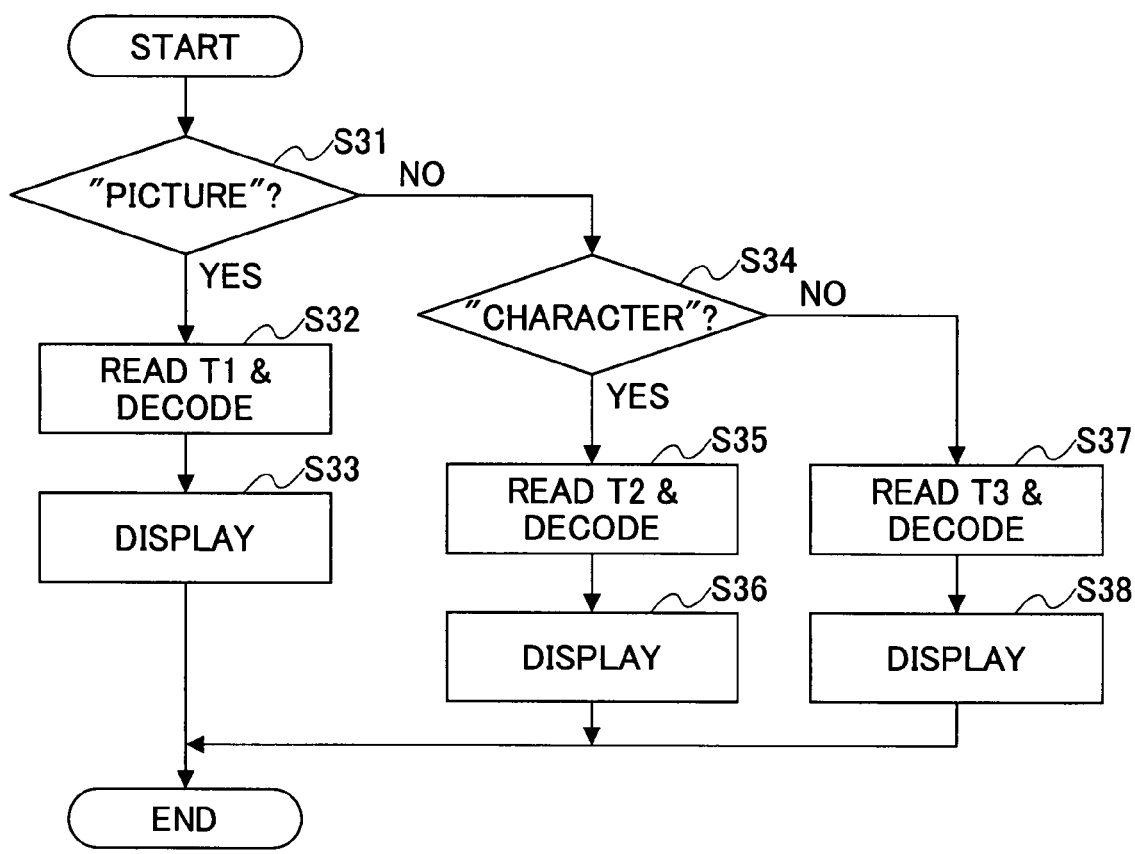
FIG. 19 is a flow chart for illustrating reading of the image depending on the type of region.

FIG. 19 is a flow chart for illustrating reading of the image depending on the type of region. The process shown in FIG. 19 is carried out by the CPU 11 of the server computer 2. In FIG. 19, a step S31 decides whether or not the type of region of the document image data to be read is "picture (photograph or the like)." If the decision result in the step S31 is YES, a step S32 regards the region as the tile T1, and reads and decodes the compressed codes (sub-bands) 1LL, 1HL, 1LH and 1HH of the decomposition level 1 shown in FIG. 3 stored in the HDD 15 of the server computer 2. A step S33 displays the image data of the decoded "picture (photograph or the like)" on the display unit 43 of the client computer 4 at a display request source. If the decision result in the step S31 is NO, a step S34 decides whether or not the type of region of the document image data to be read is "character." If the decision result in the step S34 is YES, a step S35 regards the region as the tile T2, and reads and decodes the compressed codes 2LL, 2HL, 2LH and 2HH of the decomposition level 2 stored in the storage unit 46 of the client computer 4. A step S36 displays the image data of the decoded "character" on the display unit 43 of the client computer 4 at a display request source. If the decision result in the step S34 is NO, it is determined that the type of region of the document image data to be read is "title," and the process advances to a step S37. The step S37 regards the region as the tile T3, and reads and decodes the sub-bands 3LL, 3HL, 3LH and 3HH of the decomposition level 3 stored in the storage unit 46 of a client computer 4 that is other than the client computer 4 storing the compressed codes the tile T2. A step S38 displays the image data of the decoded "title" on the display unit 43 of the client computer 4 at a display request source.

Figure 20:
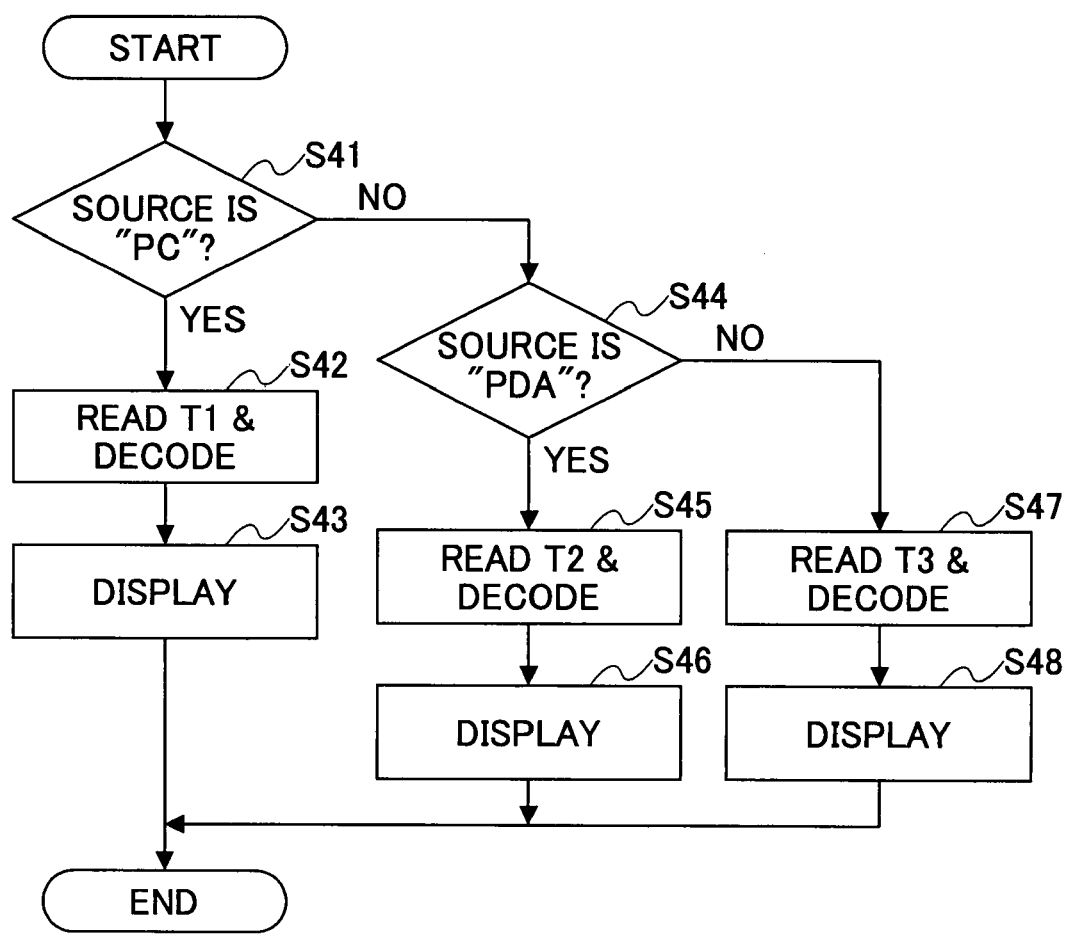
FIG. 20 is a flow chart for illustrating reading of the image depending on the type of client computer.

FIG. 20 is a flow chart for illustrating reading of the image depending on the type of client computer. The process shown in FIG. 20 is carried out by the CPU 11 of the server computer 2. In FIG. 20, a step S41 decides whether or not the type of source information terminal equipment of the document image data to be read is "personal computer (PC)." If the decision result in the step S41 is YES, a step S42 regards the region of the image data to be read as the tile T1, and reads and decodes the compressed codes (sub-bands) 1LL, 1HL, 1LH and 1HH of the decomposition level 1 shown in FIG. 3 stored in the HDD 15 of the server computer 2. A step S43 displays the decoded image data on the display unit 43 of the client computer 4 at a display request source. If the decision result in the step S41 is NO, a step S44 decides whether or not the type source information terminal equipment of the document image data to be read is "PDA." If the decision result in the step S44 is YES, a step S45 regards the region of the image data to be read as the tile T2, and reads and decodes the compressed codes 2LL, 2HL, 2LH and 2HH of the decomposition level 2 stored in the storage unit 46 of the client computer 4. A step S46 displays the decoded image data on the display unit 43 of the client computer 4 at a display request source. If the decision result in the step S44 is NO, it is determined that the type of source information terminal equipment of the document image data to be read is "portable telephone," and the process advances to a step S47. The step S47 regards the region of the image data to be read as the tile T3, and reads and decodes the sub-bands 3LL, 3HL, 3LH and 3HH of the decomposition level 3 stored in the storage unit 46 of a client computer 4 which is other than the client computer 4 storing the compressed codes the tile T2. A step S48 displays the decoded image data on the display unit 43 of the client computer 4 at a display request source.

Figure 21:
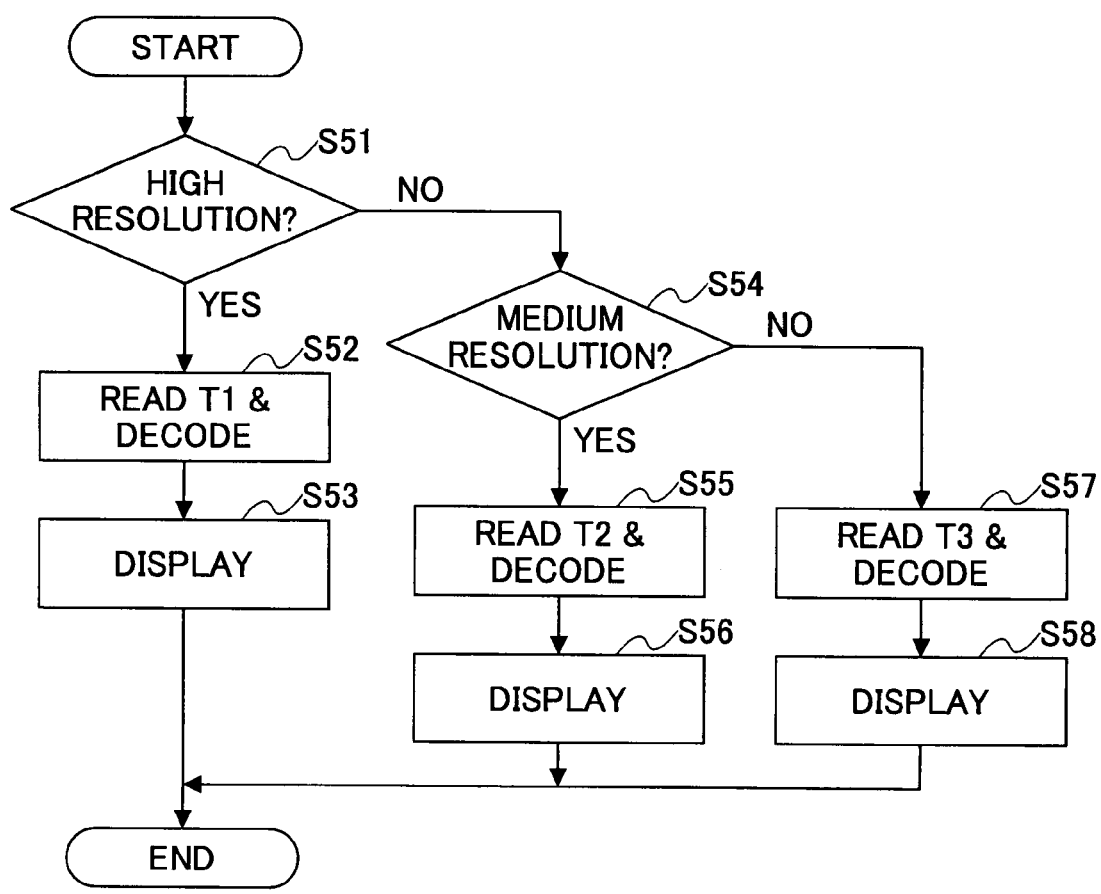
FIG. 21 is a flow chart for illustrating reading of the image depending on a user selection.

FIG. 21 is a flow chart for illustrating reading of the image depending on a user selection. The process shown in FIG. 21 is carried out by the CPU 11 of the server computer 2. In FIG. 21, a step S51 decides whether or not the document image data to be read is "high-resolution." If the decision result in the step S51 is YES, a step S52 regards the region of the image data to be read as the tile T1, and reads and decodes the compressed codes (sub-bands) 1LL, 1HL, 1LH and 1HH of the decomposition level 1l shown in FIG. 3 stored in the HDD 15 of the server computer 2. A step S53 displays the decoded image data on the display unit 43 of the client computer 4 at a display request source. If the decision result in the step S51 is NO, a step S54 decides whether or not the document image data to be read is "medium-resolution." If the decision result in the step S54 is YES, a step S55 regards the region of the image data to be read as the tile T2, and reads and decodes the compressed codes 2LL, 2HL, 2LH and 2HH of the decomposition level 2 stored in the storage unit 46 of the client computer 4. A step S56 displays the decoded image data on the display unit 43 of the client computer 4 at a display request source. If the decision result in the step S54 is NO, it is determined that the document image data to be read is "low-resolution," and the process advances to a step S57. The step S57 regards the region of the image data to be read as the tile T3, and reads and decodes the sub-bands 3LL, 3HL, 3LH and 3HH of the decomposition level 3 stored in the storage unit 46 of a client computer 4 that is other than the client computer 4 storing the compressed codes the tile T2. A step S58 displays the decoded image data on the display unit 43 of the client computer 4 at a display request source.

Of course, each of the first through third data storage units 54 through 56 may code and stored each tile. In this case, it is possible to read each tile with a desired resolution.

Figure 22:
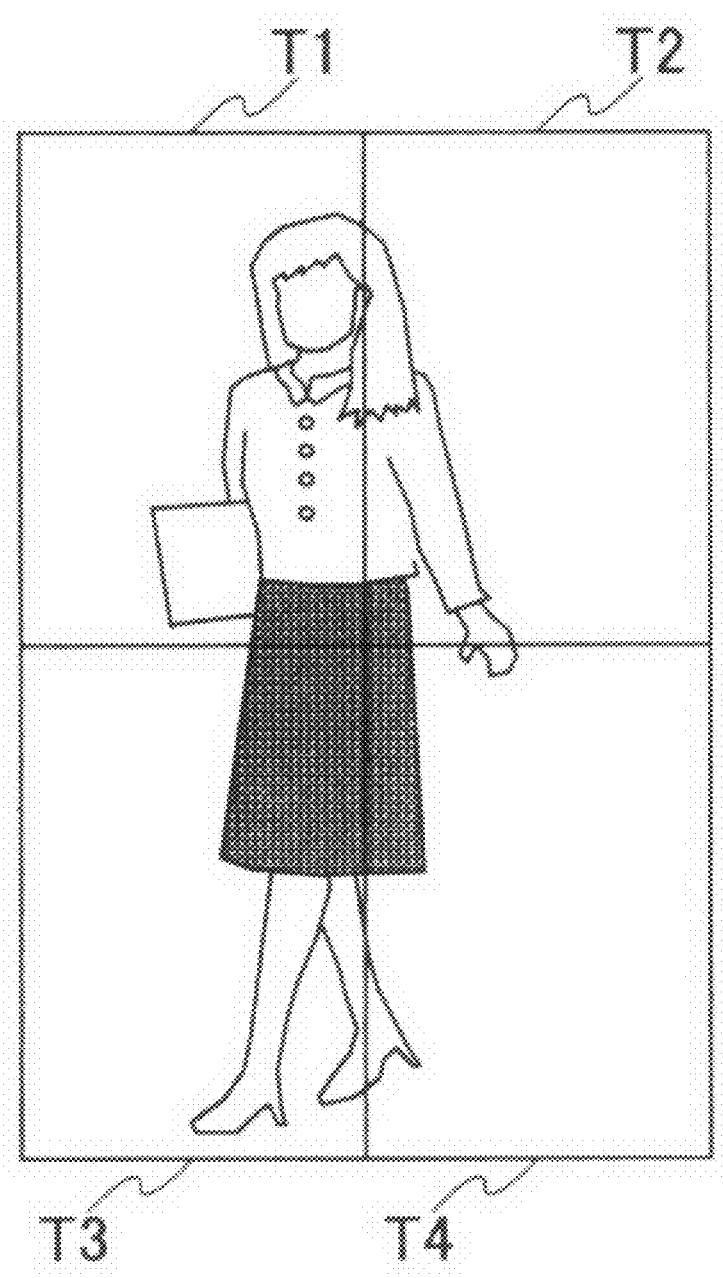
FIG. 22 is a diagram for illustrating another division of a tile image.

FIG. 22 is a diagram for illustrating another division of a tile image. FIG. 22 shows a case where the input image data from the image input device 5 or the like is divided into 4 tiles T1 through T4 by the tile image dividing unit 50. In this case, each of the tiles T1 through T4 is coded into the compressed codes (sub-bands) 1LL, 1HL, 1LH and 1HH of the decomposition level 1 shown in FIG. 3 by the first compressed code creating unit 51, and the compressed codes 1LL, 1HL, 1LH and 1HH are stored in the HDD 15 of the server computer 2 by the first data storage unit 54. In addition, each of the tiles T1 through T4 is coded into the sub-bands 2LL, 2HL, 2LH and 2HH of the decomposition level 2 by the second compressed code creating unit 52, and the sub-bands 2LL, 2HL, 2LH and 2HH are stored in the storage unit 46 of the client computer 4 by the second data storage unit 55. Furthermore, each of the tiles T1 through T4 is coded into the sub-bands 3LL, 3HL, 3LH and 3HH of the decomposition level 3 by the third compressed code creating unit 53, and the sub-bands 3LL, 3HL, 3LH and 3HH are stored in the storage unit 46 of a client computer 4 that is other than the client computer 4 that stores the sub-bands 2LL, 2HL, 2LH and 2HH of the decomposition level 2 of the tiles T1 through T4, by the third data storage unit 56. In this case, the image of each of the tiles T1 through T4 can be read with a desired resolution.

By distributively storing the compressed codes in units of tiles (small regions) into which the image data is divided in the server computer 2 and the client computers 4 (including MFP 7) which are distributed within the network 3, it is possible to realize a high-speed processing since the processing load at the time of creating the data and at the time of outputting the data such as displaying or printing the data can be distributed.

Accordingly, when displaying the image, for example, the tile (small region) images stored in each of the apparatuses (server computers 2, the client computers 4 and MFP 7) are combined and displayed. In addition, in a case where not the entire image but only a predetermined tile (small region, specified by the user, for example) is to be displayed, the predetermined data (only the predetermined tile (small region) image specified by the user) may be read from the apparatus (server computers 2, the client computers 4 or MFP 7) which stores the predetermined tile (small region) and displayed.

As described above, since the compressed codes of the image data divided into the rectangular regions are stored distributively, the image may be output to be displayed or printed by combining images of the rectangular regions. In addition, if not the entire image but only a predetermined region (specified by the user, for example) of the image is to be output to be displayed or printed, it is only necessary to obtain the compressed codes of the rectangular regions included in the predetermined region (specified by the user) and output the image to be displayed or printed. Consequently, it is possible to realize a high-speed processing since the processing load at the time of creating the data and at the time of outputting the data such as displaying or printing the data can be distributed.

Further, the present invention is not limited to these embodiments, but various variations and modifications may be made without departing from the scope of the present invention.

What is claimed is:

1. An image processing apparatus for hierarchically compressing and coding image data by subjecting pixel values of the image data to a discrete wavelet transform, quantization and coding for each of one or a plurality of rectangular regions into which the image data is divided, the image processing apparatus comprising:
 a hierarchical coding unit to compress and code the image data in a state where the image data is divided for each hierarchical layer, to obtain compressed codes, wherein the hierarchical coding unit comprises:
  a first-level coding unit to receive the image data and to create the compressed codes of a first hierarchical layer; and
  a second-level coding unit to receive a sub-band of the first hierarchical layer from the first-level coding unit and to create the compressed codes of a second hierarchical layer, wherein the second hierarchical layer is a lower hierarchical layer than the first hierarchical layer; and
 a distributively storing unit to distributively store the compressed codes that are divided for each hierarchical layer by the hierarchical coding unit, wherein the distributively storing unit comprises:
  a first-level storing unit to store the compressed codes of the first hierarchical layer, without the compressed codes of the second hierarchical layer, in a first computer; and
  a second-level storing unit to separately store the compressed codes of the second hierarchical layer, without the compressed codes of the first hierarchical layer, in a second computer.

2. An image processing apparatus for hierarchically compressing and coding image data by subjecting pixel values of the image data to a discrete wavelet transform, quantization and coding for each of one or a plurality of rectangular regions into which the image data is divided, the image processing apparatus comprising:

hierarchical coding means for compressing and coding the image data in a state where the image data is divided for each hierarchical layer, to obtain compressed codes, wherein the hierarchical coding means creates compressed codes for a first hierarchical layer and creates compressed codes for a second hierarchical layer; and distributively storing means for distributively storing the compressed codes that are divided for each hierarchical layer by the hierarchical coding means, wherein the distributively storing means comprises:

means for storing the compressed codes of the first hierarchical layer, without the compressed codes of the second hierarchical layer, in a first computer; and means for storing the compressed codes of the second hierarchical layer, without the compressed codes of the first hierarchical layer, in a second computer.

3. An image processing apparatus for hierarchically compressing and coding image data by subjecting pixel values of the image data to a discrete wavelet transform, quantization and coding for each of one or a plurality of rectangular regions into which the image data is divided, the image processing apparatus comprising:

a rectangular region coding unit to compress and code the image data in a state where the image data is divided for each rectangular region, to obtain compressed codes, wherein the rectangular region coding unit creates compressed codes for a first rectangular region and creates compressed codes for a second rectangular region; and a distributively storing unit to distributively store the compressed codes that are divided for each rectangular region by the rectangular region coding unit, wherein the distributively storing unit comprises:

a first storing unit to store the compressed codes of the first rectangular region, without the compressed codes of the second rectangular region, in a first computer; and a second storing unit to separately store the compressed codes of the second rectangular region, without the compressed codes of the first rectangular region, in a second computer.

4. The image processing apparatus as claimed in claim 3, wherein the rectangular region coding unit compresses and codes the image data with a decomposition level dependent on a type of the image data, a type of region of the image data, a type of source electronic equipment of the image data or, an external instruction.

5. An image processing apparatus for hierarchically compressing and coding image data by subjecting pixel values of the image data to a discrete wavelet transform, quantization and coding for each of one or a plurality of rectangular regions into which the image data is divided, the image processing apparatus comprising:

rectangular region coding means for compressing and coding the image data in a state where the image data is divided for each rectangular region, to obtain compressed codes, wherein the rectangular region coding means creates compressed codes for a first rectangular region and creates compressed codes for a second rectangular region; and distributively storing means for distributively storing the compressed codes that are divided for each rectangular region by the rectangular region coding means, wherein the distributively storing means comprises:

means for storing the compressed codes of the first rectangular region, without the compressed codes of the second rectangular region, in a first computer; and means for storing the compressed codes of the second rectangular region, without the compressed codes of the first rectangular region, in a second computer.

6. An article of manufacture comprising one or more recordable media having instructions stored thereon which, when executed by a computer, cause the computer to perform an image data processing method for hierarchically compressing and coding image data by subjecting pixel values of the image data to a discrete wavelet transform, quantization and coding for each of one or a plurality of rectangular regions into which the image data is divided, the method comprising:

causing the computer to compress and code the image data in a state where the image data is divided for each hierarchical layer, to obtain compressed codes, wherein causing the computer to compress and code comprises:

creating the compressed codes of a first hierarchical layer; and creating the compressed codes of a second hierarchical layer; and causing the computer to distributively store the compressed codes which are divided for each hierarchical layer by the hierarchical coding procedure, wherein causing the computer to distributively store comprises:

storing the compressed codes of the first hierarchical layer, without the compressed codes of the second hierarchical layer, in a first computer; and storing the compressed codes of the second hierarchical layer, without the compressed codes of the first hierarchical layer, in a second computer.

7. An article of manufacture comprising one or more recordable media having instructions stored thereon which, when executed by a computer, cause the computer to perform an image data processing method for hierarchically compressing and coding image data by subjecting pixel values of the image data to a discrete wavelet transform, quantization and coding for each of one or a plurality of rectangular regions into which the image data is divided, the method comprising:

causing the computer to compress and code the image data in a state where the image data is divided for each rectangular region, to obtain compressed codes, wherein the causing the computer to compress and code comprises:

creating compressed codes for a first rectangular region; and creating compressed codes for a second rectangular region; and causing the computer to distributively store the compressed codes which are divided for each rectangular region by the rectangular region coding procedure, wherein the causing the computer to distributively store comprises:

storing the compressed codes of the first rectangular region, without the compressed codes of the second rectangular region, in a first computer; and storing the compressed codes of the second rectangular region, without the compressed codes of the first rectangular region, in a second computer.

8. The article of manufacture as claimed in claim 7, wherein causing the computer to compress and code comprises causing the computer to compress and code the image data with a decomposition level dependent on a type of the image data, a type of region of the image data, a type of source electronic equipment of the image data or, an external instruction.

9. An image processing apparatus for hierarchically compressing and coding image data by subjecting pixel values of the image data to a discrete wavelet transform, quantization and coding for each of one or a plurality of rectangular regions into which the image data is divided, the image processing apparatus comprising:
- a hierarchical coding unit to compress and code the image data in a state where the image data is divided for each hierarchical layer, to obtain compressed codes, wherein the hierarchical coding unit comprises:
  - a first-level coding unit to receive the image data and to create the compressed codes of a first hierarchical layer; and
  - a second-level coding unit to receive a sub-band of the first hierarchical layer from the first-level coding unit and to create the compressed codes of a second hierarchical layer, wherein the second hierarchical layer is a lower hierarchical layer than the first hierarchical layer; and
- a distributively storing unit to distributively store the compressed codes that are divided for each hierarchical layer by the hierarchical coding unit, wherein the distributively storing unit comprises:
  - a first-level storing unit to only receive the compressed codes of the first hierarchical layer from the first-level coding unit and to store the compressed codes of the first hierarchical layer, without the compressed codes of the second hierarchical layer, in a first computer; and
  - a second-level storing unit to only receive the compressed codes of the second hierarchical layer, without the compressed codes of the first rectangular region, in a second computer.

* * * * *